(12) United States Patent
Angelini

(10) Patent No.: US 9,310,533 B2
(45) Date of Patent: Apr. 12, 2016

(54) SOLAR RADIATION COLLECTOR

(71) Applicant: Joseph A. Angelini, Knoxville, TN (US)

(72) Inventor: Joseph A. Angelini, Knoxville, TN (US)

(*) Notice: Subject to any disclaimer, the term of this patent is extended or adjusted under 35 U.S.C. 154(b) by 325 days.

(21) Appl. No.: 13/621,787

(22) Filed: Sep. 17, 2012

(65) Prior Publication Data

US 2013/0100548 A1 Apr. 25, 2013

Related U.S. Application Data

(60) Provisional application No. 61/535,656, filed on Sep. 16, 2011.

(51) Int. Cl.
*G02B 5/10* (2006.01)
*G02B 19/00* (2006.01)
*F24J 2/10* (2006.01)

(52) U.S. Cl.
CPC ............. *G02B 5/10* (2013.01); *F24J 2/1047* (2013.01); *G02B 19/0023* (2013.01); *G02B 19/0042* (2013.01); *F24J 2002/108* (2013.01); *Y02E 10/40* (2013.01)

(58) Field of Classification Search
CPC ......... Y02E 10/52; Y02E 10/42; Y02E 10/40; Y02E 10/50; G02B 19/0042; G02B 7/183; G02B 17/002; H01L 31/0525; H01L 31/0522; F24J 2/12; F24J 2/16; F24J 2/14; F24J 2002/1085; F24J 2/10; F24J 2/1057; F24J 2/06; F24J 2002/1076
USPC ........................................................ 359/853
See application file for complete search history.

(56) References Cited

U.S. PATENT DOCUMENTS

| | | | |
|---|---|---|---|
| 3,058,394 A | 10/1962 | Edlin | |
| 3,613,659 A | 10/1971 | Phillips | |
| 3,626,723 A | 12/1971 | Plumat | |
| 4,161,942 A | 7/1979 | Monk | |
| 4,240,406 A | 12/1980 | Hutchison | |
| 4,337,997 A | 7/1982 | Sadoune et al. | |
| 4,423,719 A * | 1/1984 | Hutchison | 126/694 |
| 4,520,794 A | 6/1985 | Stark et al. | |
| 4,608,964 A | 9/1986 | Russo | |
| 4,678,292 A | 7/1987 | Miyatani et al. | |
| 4,784,700 A | 11/1988 | Stern et al. | |
| 4,800,868 A | 1/1989 | Appeldorn et al. | |
| 4,919,527 A | 4/1990 | Saiylov et al. | |
| 5,592,932 A | 1/1997 | Yeomans | |
| 6,080,927 A | 6/2000 | Johnson | |
| 2007/0181173 A1 | 8/2007 | Neubauer et al. | |
| 2007/0221209 A1 | 9/2007 | Neubauer et al. | |
| 2009/0000613 A1 | 1/2009 | Edwards et al. | |
| 2009/0188562 A1 * | 7/2009 | Pavlak | 136/259 |
| 2010/0000522 A1 * | 1/2010 | Zahuranec | 126/696 |
| 2010/0006139 A1 * | 1/2010 | Zahuranec et al. | 136/246 |

FOREIGN PATENT DOCUMENTS

| | | |
|---|---|---|
| GB | 2104238 A | 3/1983 |
| WO | 2007108861 A1 | 9/2007 |
| WO | 2008145551 A1 | 12/2008 |

* cited by examiner

*Primary Examiner* — Jade R Chwasz
(74) *Attorney, Agent, or Firm* — Luedeka Neely Group, P.C.

(57) ABSTRACT

Various configurations of solar collectors are defined. Some solar collectors are formed from flat glass mirrors. Some solar collectors are formed by bending a sheet along a curve.

3 Claims, 19 Drawing Sheets

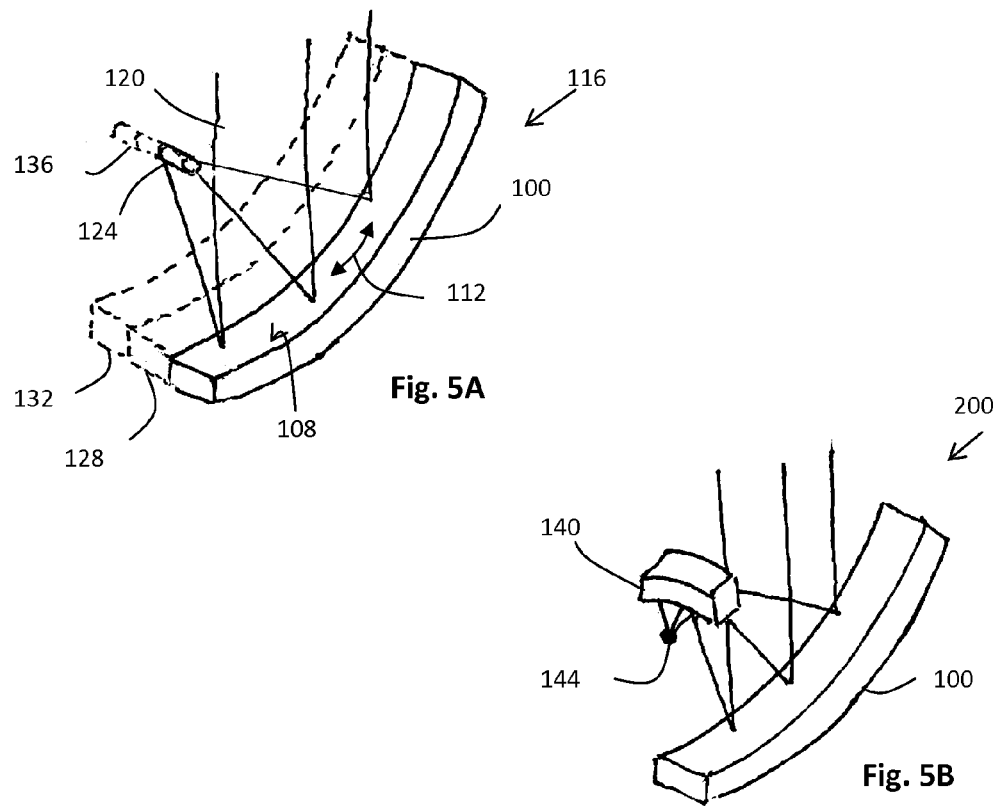
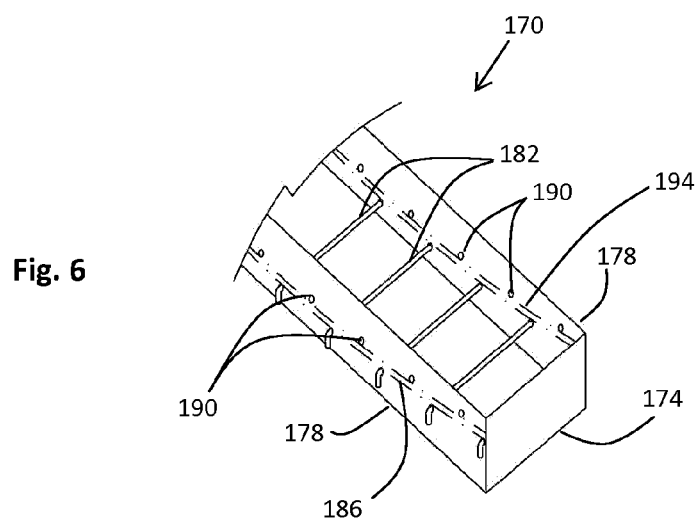

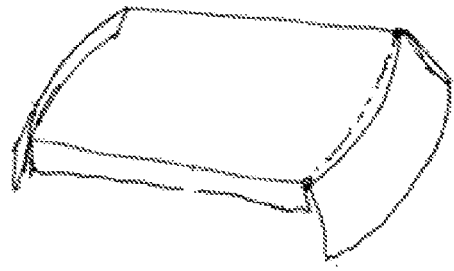
Fig. 27
Fig. 28
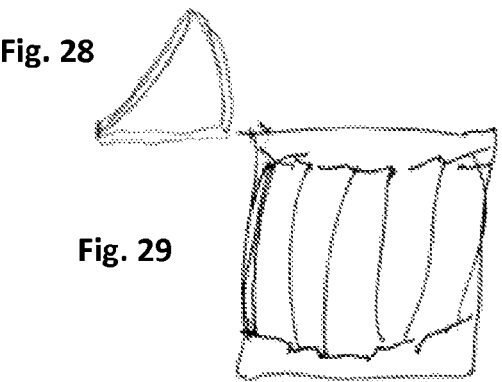
Fig. 29
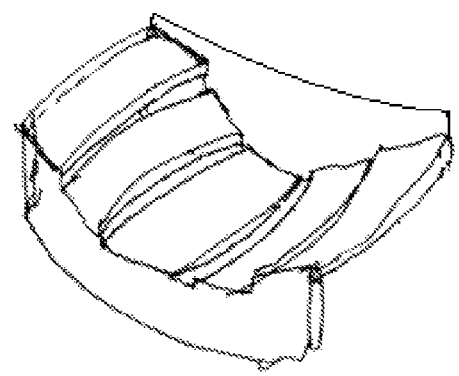
Fig. 30
Fig. 31
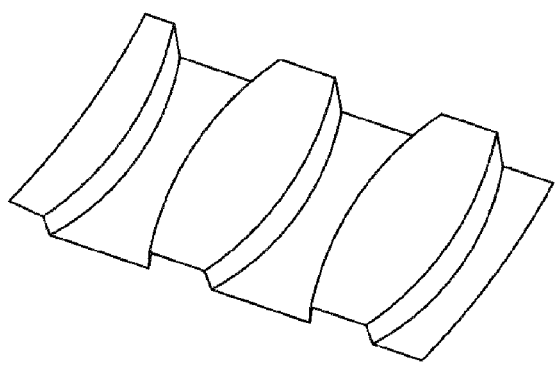

SOLAR RADIATION COLLECTOR

CROSS REFERENCES TO RELATED APPLICATIONS

This patent application claims priority from and is related to U.S. Provisional Patent Application Ser. No. 61/535,656 filed 16 Sep. 2011, entitled: "Solar Radiation Collector." This application claims a priority date of 16 Sep. 2011, which is the filing date of U.S. Provisional Patent Application Ser. No. 61/535,656 filed 16 Sep. 2011. U.S. Provisional Patent Application Ser. No. 61/535,656 is incorporated by reference in its entirety herein.

FIELD

This disclosure relates to the field of solar energy. More particularly, this disclosure relates to devices for spatial concentration of solar radiation.

BACKGROUND

Various devices are available for converting solar radiation into either thermal or electrical energy. Examples of devices for converting solar radiation into thermal energy are solar water heaters, solar cookers, solar boilers, thermal mass systems, and systems that heat a thermal working fluid. Examples of devices for converting solar radiation into electrical energy are photovoltaic cells, thermovoltaic cells, and thermal engines, such as a Sterling engine, which use a thermal working fluid to move an apparatus that is configured to generate electricity. Often it is desirable to focus or at least concentrate solar energy flux in order to improve the efficiency of devices that are used to convert solar radiation into thermal or electrical energy. Because solar energy arrives on earth in light beams that are essentially parallel, a mirror having a parabolic shape is traditionally a preferred device for collecting and concentrating solar energy. However, manufacturing parabolic-shaped mirrors is generally difficult and expensive. What are needed therefore are more cost-effective solar collectors.

SUMMARY

The present disclosure provides a solar collector having a plurality of flat glass mirrors, where each flat glass mirror has two opposing ends and two opposing substantially parallel sides that are generally orthogonal to the ends and that define a longitudinal direction. In this embodiment there is also a frame structure to constrain each flat glass mirror with a plurality of hold-down features disposed along the longitudinal direction of each flat glass mirror, wherein each flat glass mirror is deflected and constrained to form a deflected flat glass mirror with curved mirror surface having a focal zone that is parallel to that flat glass mirror's curved surface, such that solar light is reflected from the plurality of deflected flat glass mirrors to a solar light concentration zone.

Further provided is a solar collector having a longitudinal focal plane and a transverse focal plane. This embodiment includes a plurality of mirror segments where each mirror segment has a lower end and an opposing upper end and a lower side and an opposing upper side. Further in this embodiment, each mirror segment includes a parabolical curved surface having focal zone. The lower end of each of the mirror segments is disposed adjacent the transverse focal plane. Also, the mirror segments are disposed in a direction that is generally parallel to the longitudinal focal plane and are disposed offset from each other in a direction that is generally perpendicular to their sides such that for an outward mirror segment the lower edge of each outward mirror segment is disposed adjacent the upper edge of an adjacent mirror segment, and the focal zones of adjacent mirror segments are angularly offset from each other in the transverse focal plane.

Also provided is a solar collector having a plurality of solar reflectors each having each having two opposing edges, each edge formed as a compound parabolical curve, with at least one of the edges of each solar reflector being disposed adjacent one of the edges of another solar reflector. Also provided herein is a method of creating both a portion of a trough and a conical surface adjacent to the trough to support the trough. The method includes bending a sheet along a curve.

BRIEF DESCRIPTION OF THE DRAWINGS

Various advantages are apparent by reference to the detailed description in conjunction with the figures, wherein elements are not to scale so as to more clearly show the details, wherein like reference numbers indicate like elements throughout the several views, and wherein:

FIGS. 5A and 5B are somewhat schematic perspective drawings of solar collector elements.

FIG. 6 is a perspective drawing of a portion of a wire and sheet material mirror support structure.

FIGS. 27-31 illustrate multiple supports formed on a single sheet.

DETAILED DESCRIPTION

In the following detailed description of the preferred embodiments, reference is made to the accompanying drawings, which form a part hereof, and within which are shown by way of illustration the practice of specific embodiments of solar collectors. It is to be understood that other embodiments may be utilized, and that structural changes may be made and processes may vary in other embodiments.

Figure 1:
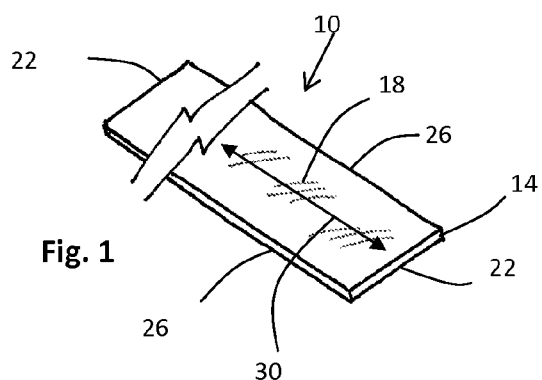
FIG. 1 is a perspective drawing of a portion of a flat glass mirror.

FIG. 1 illustrates a portion of a flat glass mirror 10. As used herein the term "flat glass mirror" refers to a mirror that is typically made from common soda-lime glass, and typically "float glass" where molten glass is floated on molten tin to produce a flat liquid glass layer that is then cooled during an annealing step to form a very flat glass substrate 14 for the flat glass mirror 10, upon which a reflective surface 18 is subsequently formed. The glass substrate 14 is typically formed from a mixture that comprises (and typically consists substantially of) a combination of one or more ingredients selected from silica (silicon dioxide), sodium oxide, lime (calcium oxide), soda ash (sodium carbonate), calcium carbonate, dolomite (calcium magnesium carbonate), alumina (aluminum oxide), and "cullet" (scrap glass). The glass substrate 14 of the flat glass mirror 10 is not formed from specialty glass compositions such as borosilicate glass. In the flat glass mirror 10, the glass substrate 14 is typically silvered on what becomes the mirror's back surface, using standard mirror silvering technology. Note that the surface of a mirror that is closest to the source of light that is reflected by a mirror (typically thought of as the "front" surface of a mirror is referred to herein as the "reflecting surface" even if (as just described) the material that does the reflecting is physically disposed on the opposing "back" surface of the mirror. In some embodiments of a flat glass mirror a reflecting material such as vacuum deposited aluminum may be coated onto the front surface of glass substrate 14. After the production of the glass substrate 14 for use in the flat glass mirror 10, neither the glass substrate 14 nor the glass substrate 14 bearing the reflective surface 18 is subjected to further annealing or to thermal or chemical tempering (such as pre-tensioning). A metal foil may be adhered to the backside of the mirror to increase corrosion resistance. Other types of flat glass mirrors such as specialty outdoor rated solar mirror may be used, like as those manufactured by Flabeg.

The flat glass mirror 10 is a mirror having a substantially flat shape when in a free state. The term "in a free state" means a condition where the mirror is mechanically or gravitationally un-constrained. The flat glass mirror 10 (or any mirror described herein as having a flat shape in a free state) may be deflected (i.e. constrained) to form a curved surface, but the flat glass mirror 10 springs back to a substantially flat configuration when the deflection force is removed and the flat glass mirror 10 returns from a constrained state to a free state. Among the advantages of the use of the flat glass mirror 10 are its low cost, its ready availability, its high quality optical characteristics (related to reflectivity), and the ease of packaging and shipping flat glass mirrors. A flat glass mirror is an example of a flexible flat mirror.

As further seen in FIG. 1, the flat glass mirror 10 has two opposing ends 22 and two opposing substantially parallel sides 26 that are generally orthogonal to the opposing ends 22. The two substantially parallel sides 26 define a longitudinal direction 30 for the flat glass mirror 10. In the embodiment of FIG. 1 the parallel sides 26 of the flat glass mirror 10 are straight lines, but in some embodiments the parallel sides 26 may be curved lines that form the sides are "curvilinear parallel," meaning that opposing points on their sides are equidistant apart.

It has been unexpectedly found that flat glass mirrors may be sufficiently deflected without breaking and constrained in a deflected configuration that is adequate to have application in solar collectors. For example, Table 1 depicts the deflection of a rectangular 12" by 48", 0.077" thick flat glass mirror constrained at 3 discrete locations along each side of the 48" dimension (which is the longitudinal dimension). This mirror is constrained near or at each of its four corners and midway down each long side and measured with the mirror in a horizontal position. Furthermore, Table 1 is a case in which a side-view of the parabolic curve having a vertical Y axis, horizontal X axis, a theoretical focal point of (0, 57.93694), an X value of 2 for the lowest end point, or starting point, of the parabolic curve, and a reference line L1-5 between the two endpoints, point 1 and point 5, along the parabolic curve from which deflection is considered to be line segments originating on and perpendicular to the line L1-5 and ending on the parabolic curve.

TABLE 1

| d—Distance along line L1-5 between end points of the parabolic curve (inches) | P—Deflection measurements perpendicular to line L1-5 at each distance d (inches) | Deflection of Best Fit Parabola perpendicular to line L1-5 at each distance d (inches) | Difference (inches) |
|---|---|---|---|
| 0 | 0.003 | 0 | −0.003 |
| 11.927 | 1.632 | 1.753 | 0.121 |
| 23.854 | 2.281 | 2.288 | 0.007 |
| 35.781 | 1.594 | 1.681 | 0.087 |
| 47.708 | 1.594 | 0 | −0.018 |

The deflection measurements of the flat glass mirror of Table 1 have a correlation coefficient, R, with the deflection of the Best Fit Parabola of 0.9988.

For example, Table 2 depicts the deflection of a rectangular 12" by 48", 0.077" thick flat glass mirror constrained at 3 discrete locations along each side of the 48" dimension (which is the longitudinal dimension). This mirror is constrained near or at each of its four corners and midway down each long side and measured with the mirror in a horizontal position. Furthermore, Table 1 is a case in which a side-view of the parabolic curve having a vertical Y axis, horizontal X axis, a theoretical focal point of (0, 195.98134), an X value of 12 for the lowest end point, or starting point, of the parabolic curve, and a reference line L1-5 between the two endpoints, point 1 and point 5, along the parabolic curve from which deflection is considered to be line segments originating on and perpendicular to the line L1-5 and ending on the parabolic curve.

TABLE 2

| d—Distance along line L1-5 between end points of the parabolic curve (inches) | P—deflection measurements perpendicular to line L1-5 at each distance d (inches) | Deflection of Best Fit Parabola perpendicular to line L1-5 at each distance d (inches) | Difference (inches) |
|---|---|---|---|
| 0.0 | 0.000 | 0 | 0 |
| 12.0 | 0.532 | 0.5450 | 0.014 |
| 24.0 | 0.724 | 0.7247 | 0.001 |
| 36.0 | 0.525 | 0.5420 | 0.017 |
| 48.0 | 0.034 | 0 | −0.034 |

The deflection measurements of the flat glass mirror of Table 2 have a correlation coefficient, R, with the deflection of the Best Fit Parabola of 0.9989.

Figure 2:
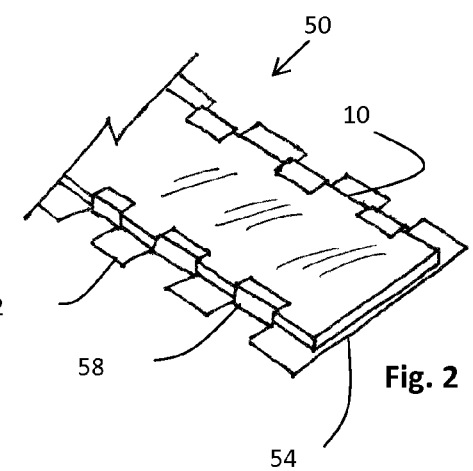
FIG. 2 is a perspective drawing of a portion of the flat glass mirror of FIG. 1 mounted on a sheet backing material.

FIG. 2 illustrates a solar collector pre-form 50. The flat glass mirror 10 (of FIG. 1) is mounted on a sheet backing material 54. The sheet backing material 54 is typically formed from a metal sheet. The sheet backing material 54 has a plurality of mirror tabs 58 that are used to attach the sheet backing material 54 to the flat glass mirror 10. The sheet backing material 54 also has a plurality of mounting tabs 62 that are used to mount the solar collector pre-form 50 to a support structure.

Figure 3:
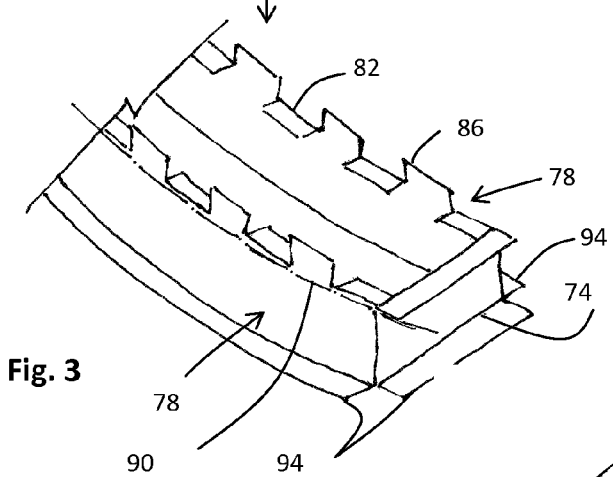
FIG. 3 is a perspective drawing of a portion of a mirror support structure fabricated from sheet material.

FIG. 3 illustrates a sheet material frame structure 70. The sheet material frame structure has two opposing ends (with one end 74 shown in FIG. 3) and two opposing substantially parallel sides 78. Each of the parallel sides 78 has a plurality of support tabs 82 and a plurality of deflection tabs 86. In this embodiment the support tabs 82 lie along a curve 90 having a parabolic shape. As used herein the term "shape" of a curve refers to the trace of points along the curve. As used herein the term "parabolic" refers to a shape having a non-linear regression coefficient with a best fit parabola of >0.99. Flanges 94 are provided on the parallel sides 78 and the ends 74 of the sheet material frame structure 70 to enhance the rigidity of the sheet metal frame structure 70.

Figure 4:
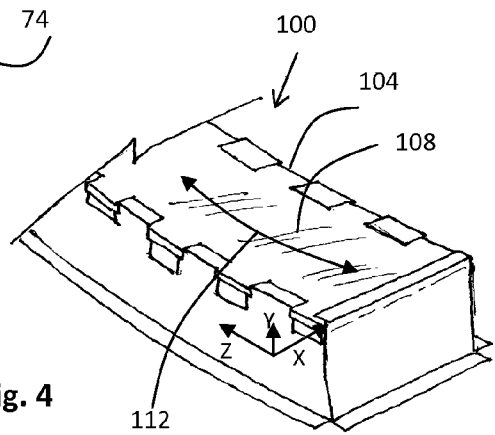
FIG. 4 a perspective drawing of the portion of the flat glass mirror and sheet backing material of FIG. 1 mounted on the portion of the mirror support structure of FIG. 2.

FIG. 4 illustrates a solar collector element 100. The solar collector element 100 is formed by positioning the solar collector pre-form 50 of FIG. 2 on the support tab 82 of the sheet material frame structure 70 of FIG. 1, and deflecting the flat glass mirror 10 (and the sheet backing material 54) downward (as implied by the frame of reference of FIGS. 3 and 4) in a direction that is orthogonal to the reflecting surface 18 of the flat glass mirror 10, and securing the flat glass mirror 10 (and the sheet backing material 54) in place using the deflection tabs 86 of the sheet material frame structure 70. The deflection tabs 86 are examples of discrete hold-down features that are disposed along the longitudinal direction 30 of the flat glass mirror 10 in a pattern having a substantially parabolic shape. The deflection tabs 86 are also examples of braces that are disposed adjacent and substantially perpendicular to at least one of the parallel sides of a flat glass mirror. In the embodiment of FIG. 4 the solar collector pre-form 50 is further secured to the sheet metal frame structure 70 by bending the mounting tabs 62 of the sheet backing material 54 against the sides 78 of the sheet metal frame structure 70, such that the flat glass mirror 10 forms a deflected flat glass mirror 104 having a curved surface 108 that is bowed in a configuration that approximates the parabolic curve 90 of the support tabs 82. The curved surface 108 is an example of a parabolical shaped mirror. The term "parabolical" as used herein refers to a shape that is at least parabola-like; meaning that it has a surface formed by a plurality of parallel lines that are generally parabolical, or by a plurality of parallel lines that approximately resemble portions of a parabola, or by a plurality of parallel lines that are somewhat parabolical, but in any case, a "parabolical" shape as viewed in at least one plane (such as plane Y-Z of FIG. 4) has a best-fit non-linear regression coefficient between the parabolical shape and a portion of a parabola that is at least 0.90 but less than 0.99. In some instances the best-fit non-linear regression coefficient is at least 0.96 but less than 0.99 (i.e., is "generally parabolical). In some instances the best-fit non-linear regression coefficient is at least 0.97 but less than 0.99 (i.e., is approximately parabolical). In some instances the best-fit non-linear regression coefficient is at least 0.95 but less than 0.98 (i.e., is somewhat parabolical). In some instances the best-fit non-linear regression coefficient is at least 0.95 but less than 0.97. It is important to note that optimal shape for a mirror used to focus parallel beams of light to a spot is a parabolic shape. The term "best-fit" applies to mathematical assessment of the conformance of a non-optimal shape to the optimal shape. It is unexpected that a non-optimal shape is suitable for use a focusing mirror provided that it is reasonably close to the optimal shape (i.e., it has a sufficiently high linear regression coefficient). Thus the result of these defined limitations is not an optimization of a result-effective variable (i.e., the regression coefficient parameter) but rather a recognition that sub-optimization is suitable. The lower limit of the non-linear regression coefficient is set by the minimum acceptable focus performance considerations. A non-linear regression coefficient of less than 0.90 will likely not adequately focus the beam. The upper limit of the non-linear regression coefficient is set by fabrication considerations. Conforming the surface to be closer to a true parabolic shape will likely require too much mechanical complexity for what would be minimal further improvement in focusing performance.

When deflected and bowed in the configuration depicted in FIG. 4, the deflected flat glass mirror 104 has a curved longitudinal direction 112. FIG. 4 also illustrates the relative directions "up" (and comparable terms such as "upper" and "above") and "down" (and comparable terms such as "lower" and "below" and "under") as these terms are used herein when viewing perspective illustrations. "Up" and a comparable term corresponds to the +Y direction of the orthogonal X-Y-Z axes depicted in FIG. 4, and "down" and a comparable term corresponds to the −Y direction.

FIG. 5A illustrates how the solar collector element 100 (depicted for simplicity in FIG. 5A with certain details of construction omitted) may be used to form a solar collector 116 that reflects solar light 120 is reflected a focal zone 124 that is parallel to the curved surface 108 and perpendicular to the longitudinal direction 112 of the deflected flat glass mirror 104. The focal zone 124 may be a focal axis (i.e., a focal line) or, because the curved surface 108 may only approximate a parabola, the focal zone 124 may be "bigger" than a line, such as the cylinder-like shape depicted in FIG. 5A. Surprisingly it has been found that a parabolical shape is adequate to for use in solar collector applications.

Generally the longitudinal direction 112 of a mirror is parallel to the longer dimension of the curved surface 108 of the mirror. However as used herein the "longitudinal direction" of a mirror is defined as the direction parallel to the dimension of a mirror that is perpendicular to the focal zone of the mirror. Consequently in some embodiments the longitudinal direction of a mirror may be parallel to the shorter dimension of the surface of the mirror.

Typically a plurality of solar collector elements 100 are deployed together and solar light 120 is reflected from the plurality of constrained flat glass mirrors to a solar light concentration zone. In some embodiments a plurality of solar collector elements are disposed in a parallel configuration with their parallel sides 26 adjacent each other, such as first, second and third solar collector elements 100, 128 and 132 in FIG. 5A. In such embodiments the concentration zone is a line-like spatial regions such as concentration zone 136 depicted in FIG. 5A. In some embodiments the a plurality of solar collector elements are disposed in a non-parallel configuration such as first solar collector element 100 and second solar collector element 140 in FIG. 5B. In such embodiments the concentration zone is a spot-like spatial region 144.

FIG. 6 depicts a wire and sheet material mirror support structure 170. The support structure 170 has two opposing ends (with one end 174 depicted in FIG. 6 and two substantially parallel sides 178. A first set of wires 182 span the space between the two sides 178. The first set of wires 182 are disposed along a path 186 that is substantially parabolic in shape. The term "substantially parabolic" as used herein refers to a shape having a best-fit non-linear regression coefficient between its shape and a portion of a parabola of at least 0.95 but less than 0.99.

Typically the first set of wires 182 are disposed through a series of holes in the sides 178 of the support structure 170, and the ends of the wires are bent or crimped to hold them in place. A set of wire holes 190 are disposed in each of the sides 178. The second set of wire holes each follow a path 194 that is substantially parabolic and offset in the upward direction (as referenced by the perspective of FIG. 6). A solar collector element may be fabricated by positioning a flat glass mirror (such as flat glass mirror 10 of FIG. 1) on the first set of wires 182 of the support structure 170 and then deflecting the flat glass mirror in a downward direction (as reference by the perspective of FIG. 6) so that the flat glass mirror is disposed adjacent the first set of wires 182. While the flat glass mirror is deflected against the first set of wires 182 a second set of wires may be inserted through the set of wire holes 190 as discrete hold-down features to constrain the flat glass mirror and form a curved mirror surface that is bowed in a parabolical shape that approximates the parabolic curve path 194 of the set of wire holes 190. When so-configured, the first set of wires 182 and the second set of wires that are inserted through the set of wire holes 190 are examples of braces that are disposed adjacent and substantially perpendicular to at least one of the parallel sides of a flat glass mirror. A solar collector element fabricated using the support structure 170 may be used in place of the solar collector element 100 depicted in the solar collectors 116 and 200 of FIGS. 5A and 5B respectively.

Figure 7:
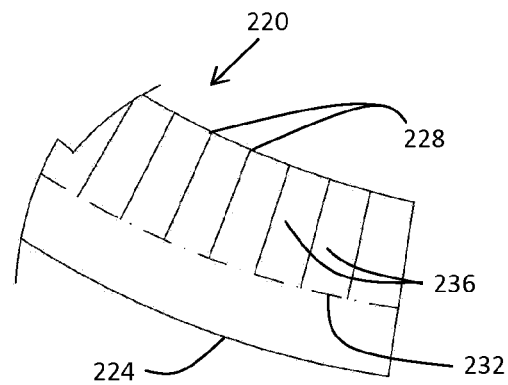
FIG. 7 is a perspective drawing of an intermediate stage of fabrication of a portion of a mirror support fabricated from sheet material.

FIG. 7 depicts a portion of a pre-form 220 for a sheet metal support structure. The preform 220 has and edge surface 224 that is parabolic in shape. A series of slits 228 are cut on the edge opposing the edge surface 224 to a depth that follows a parabolic curve 232 that is curvilinearly parallel to the parabolic edge surface 224. The slits 228 form bendable tabs 236.

Figure 8:
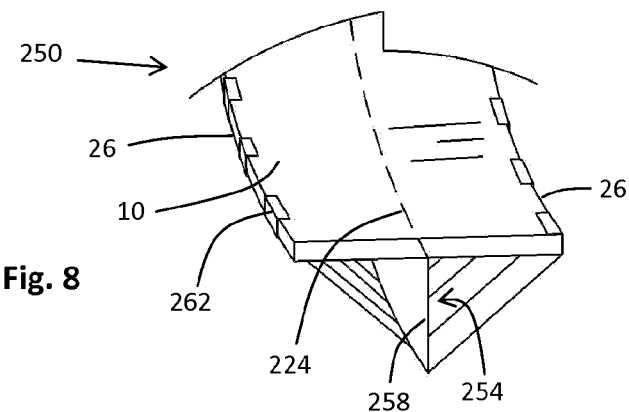
FIG. 8 is a perspective drawing of the portion of the mirror support of FIG. 7 with a portion of a flat glass mirror mounted thereon.

FIG. 8 depicts a solar collector element 250 formed using a frame structure 254 formed from the pre-form 220 of FIG. 7. What is now a rib 258 of the frame structure 254 is mated to the flat glass mirror 10 of FIG. 1A in an orientation where the flat glass mirror's 10 reflecting surface points up (as referenced by the perspective orientation of FIG. 8) and is disposed adjacent the parabolic-shaped edge surface 224 of the rib 258. The bendable tabs 236 have been bent down and in an alternating pattern over the parallel sides 26 of the flat glass mirror 10 as discrete hold-down features 262 to deflect and constrain the mated flexible flat glass mirror 10 toward the edge 224 having the parabolical shape.

Figure 9:
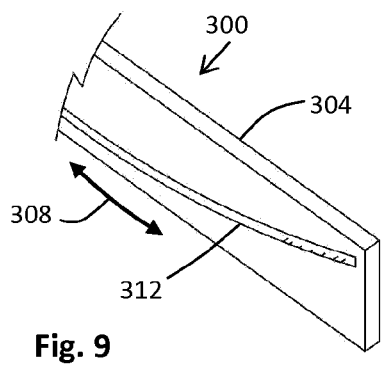
FIG. 9 is perspective drawing of a portion of a slotted plate for supporting a flat glass mirror.

FIG. 9 depicts a support structure 300 for a flat glass mirror. The support structure 300 has a plate 304 with a longitudinal direction 308. The plate 304 has a slot 312 having a parabolic contour. The plate 304 may be mated with a flat glass mirror (e.g., the flat glass mirror 10 of FIG. 1) by bowing and inserting the flat glass mirror into the slot 312 such that the longitudinal direction (e.g., longitudinal direction 30 of FIG. 1) of the flat glass mirror and the longitudinal direction 308 of the plate 304 are substantially parallel and the mated flat glass mirror is deflected and constrained by the parabolical contour of the slot 312. Note that the surfaces the slot 312 are not "discrete hold-down features." Instead, these surfaces provide a plurality of continuous hold-down features. A plurality of hold-down features may be continuous or discrete. A plurality of hold-down features (either continuous or discrete) that are disposed along the sides of a flat glass mirror help to constrain the mirror in a precisely defined shape.

Figure 10:
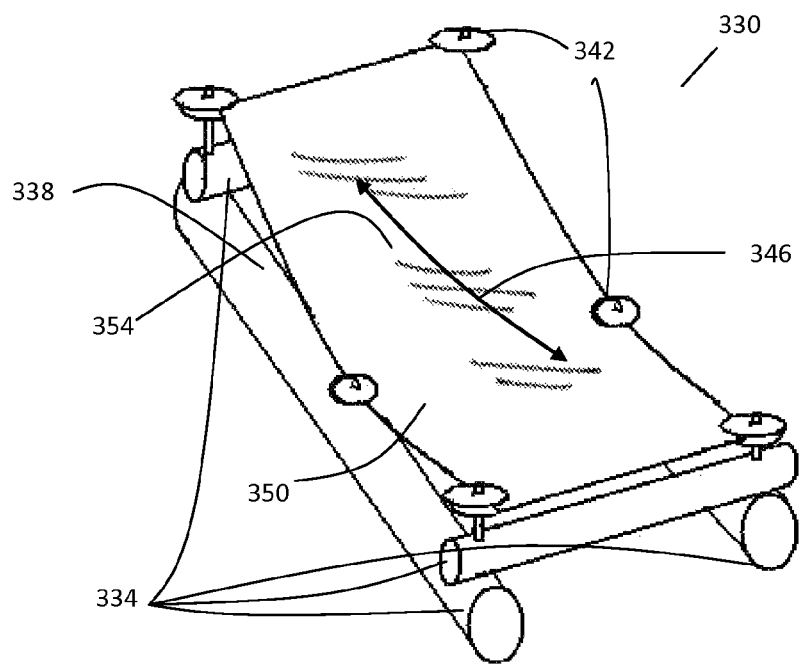
FIG. 10 is perspective drawing of a portion of a tubular support structure with standoffs for a mirror showing a portion of a flat glass mirror mounted thereon.

FIG. 10 depicts a portion of a solar collector element 330. The solar collector element 330 includes four tubular members 334 that each have straight surfaces 338. A series of threaded stand-offs, nuts, and washers 342 are used as hold-down features disposed along the longitudinal direction 346 for deflecting and constraining the flat glass mirror 10 (of FIG. 1) as a deflected flat glass mirror 350 with a curved mirror surface 354.

Figure 11:
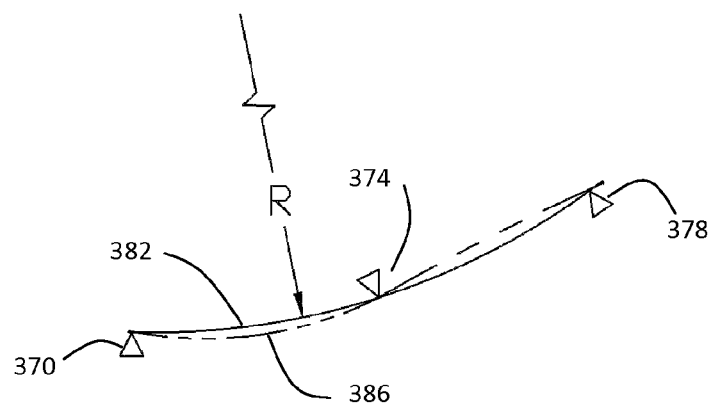
FIG. 11 depicts the deflection curve of a flat glass mirror in comparison with a parabolic curve.

FIG. 11 depicts a characteristic of solar collector elements that comprise discrete hold-down features. When flat glass mirrors are deflected with discrete hold-down features the sites alternate sequentially with respect to whether they are applying force in directed toward the reflective surface or applying force directed away from the reflective surface. In FIG. 11 three discrete hold-down fixtures 370, 374 and 378 are depicted. The first discrete hold-down fixture 370 applies a force directed away from the reflective curved mirror surface, the (next) second discrete hold-down fixture 374 applies a force directed toward the reflective mirror surface, and the next (third) discrete hold-down fixture 378 applies a force directed away from the reflective curved mirror surface. If the discrete hold-down fixtures 370, 374 and 378 are evenly spaced (as depicted in FIG. 11) the reflective surface will likely form a circular section 382 between the first hold-down fixture 370 and the third hold-down fixture 378. Such a circular section 382 will have a radius R. A parabolic curve 386 may be drawn between the loci of the first, second and third hold-down fixtures 370, 374, and 378. As shown in FIG. 11 the portion of the circular section 382 between the first hold-down fixture 370 and the second hold-down fixture 374 will be above the parabolic curve 386 and the portion of the circular section 382 between the second hold-down fixture 374 and the third hold-down fixture 378 will be above the parabolic curve 386. If the discrete hold-down fixtures 370, 374 and 378 are not evenly spaced the reflective surface may form an irregular curved surface. However, the curved surface of a flat glass mirror formed by three or more discrete hold-down features is typically a curved surface that alternately passes below and then above a parabola drawn between any three adjacent discrete hold-down features. The circular section 382 is also characterized as a "substantially-symmetrical-arc-shaped segment." "Substantially-symmetrical-arc-shaped segments" are sections of a mirror where the section is substantially symmetrical on either side of its midpoint. Note that a parabolic curve, such as parabolic curve 386 of FIG. 11, is not a substantially-symmetrical-arc-shaped segment.

Figure 12A:
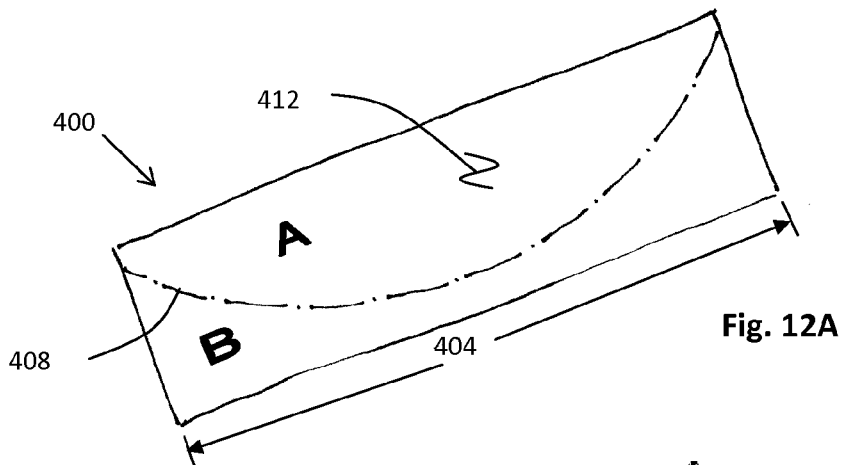
FIG. 12A is a top plan view of a sheet material with a bend curve depicted thereon.
Figure 12B:
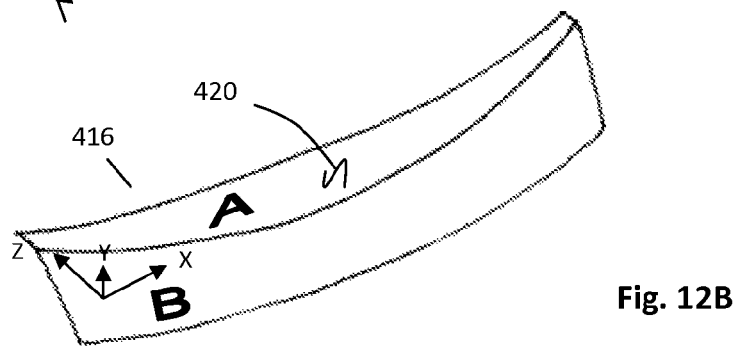
FIG. 12B is perspective drawing of the sheet material of FIG. 12A after it is bent at 90° along the bend curve to form a 3-dimensional sheet structure.
Figure 12C:
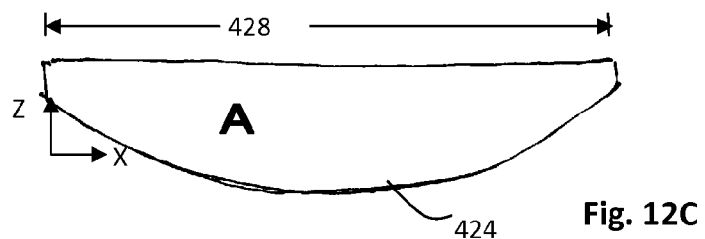
FIG. 12C is top plan view of the 3-dimensional sheet structure of FIG. 12B.
Figure 12D:
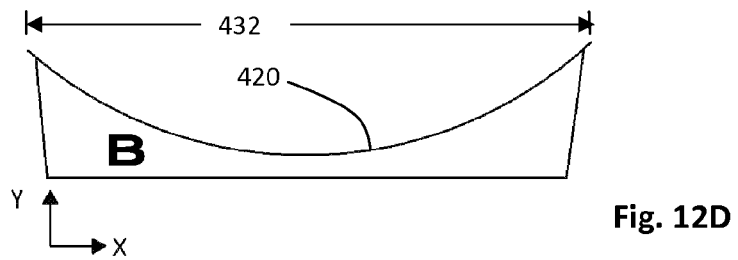
FIG. 12D is a front view of the 3-dimensional sheet structure of FIG. 12B.

FIG. 12A depicts a plan view of a pre-form 400 for a support structure for a solar collector element or for curved mirror for a solar collector. The pre-form 400 is formed from flat sheet material, such as sheet metal. The pre-form 400 has a length 404 and the pre-form 400 has a bend curve 408 inscribed on a surface 412 of the pre-form 400. The bend curve 408 separates region A from region B on the surface 412 of pre-form 400. Note that while the pre-form 400 is referred to here as a "support structure" for a solar collector element, the pre-form 400 may become the solar collector element (when bent as subsequently described) if the surface 412 is sufficiently reflective. FIG. 12B depicts a perspective view of the pre-form 400 after region B has been bent perpendicular to region A along the bend line 408 to form a solar collector structure 416. The bending may be accomplished in a single operation by using a metal forming tool such as a press brake, or may be accomplished in a series of incremental steps by using a manual tool such as a pliers. The process of bending region B perpendicular to region A along the bend line 408 transforms region A into a curved surface 420. A reference X-Y-Z axis is depicted in FIG. 12B. FIG. 12C is a top view (the X-Z plane) of solar collector structure 416 showing a curve 424 of the region B. FIG. 12C also illustrates that the solar collector structure 416 has a length 428 as viewed from a top view. FIG. 12D is a front view (the X-Y plane) of the solar collector structure 416 showing the curved surface 420. The curved surface 420 has a length 428 as viewed from the front view. As best seen by comparing FIG. 12A with FIGS. 12C and 12D, the process of bending the pre-form 400 along the bend curve 408 causes the length 404 of the pre-form 400 (as viewed from the top view of FIG. 12A) to shrink to a shorter length 428 (as viewed from the top view of FIG. 12C). Similarly curve 424 (as viewed from the top view of FIG. 12C) is shorter than the bend curve 408 of the preform (as viewed from the top view of FIG. 12A), and the length 432 of the curved surface 420 (as viewed from the front view of FIG. 12D) is shorter than the length 404 of the pre-form 400 (as viewed from the top view of FIG. 12A). The sheet material does not shrink, but the bending process produces foreshortening of the top view (and the front view) of the solar collector structure 416 compared with the length of/L1) of the pre-form 400. The solar collector structure 416 may be used as a support structure for a solar collector element by affixing a flat glass mirror to the curved surface 420, such as with an adhesive, which may be used to form a plurality of continuous hold-down features or a plurality of discrete hold-down features. Alternately, the solar collector structure 416 may itself be used as a solar collector element if the curved surface 420 is sufficiently reflective. For example, the solar collector structure 416 may be constructed using a metal mirror formed as an aluminum substrate having an anodized surface, a physical vapor deposition (PVD) layer disposed on the anodized layer and a nano-composite protective layer disposed on the PVD layer, a substrate laminated with a reflective film and sealed at edges with sealing tape, stainless steel sheet with a variety of surface finishes and thicknesses available but able to be largely or completely self-supporting using the bend curve method down to about a thickness of 0.003", drastically reducing cost, or aluminum, anodized aluminum sheet, or other reflectors. Such products are available from Alanod GmbH & Co KG, Reflectech, Ulbrech or some other stainless steel suppliers or distributors, Alcoa, and other suppliers, respectively.

Figure 13A:
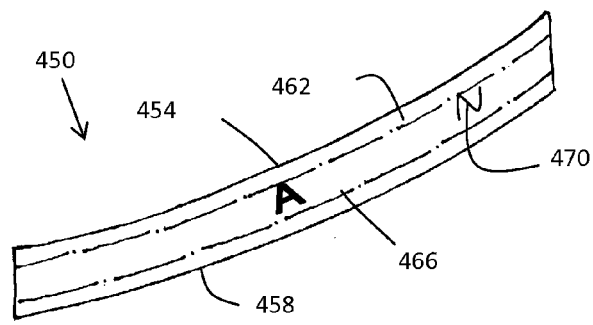
FIG. 13A is a top plan view of a sheet material with two bend curves depicted thereon.
Figure 13B:
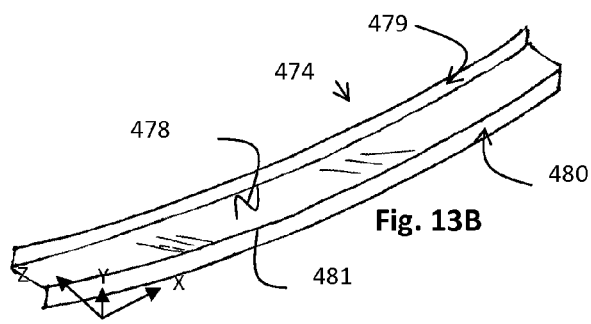
FIG. 13B is perspective drawing of the sheet material of FIG. 13A after it is bent at 90° along the bend curves to form a 3-dimensional sheet structure.

FIG. 13A depicts a plan view of a pre-form 450 for a solar collector structure. The pre-form 450 is formed from flat sheet material, such as sheet metal. The pre-form 450 has a first parabolic-shaped edge 454 and a second parabolic-shaped edge 458. The pre-form 450 also has two bend parabolic bend curves 462 and 466 inscribed on a surface 470 of the pre-form 450. When the term "parabolic" is used herein without a modifying word it refers to a shape that is as close to being a parabola as possible within reasonable manufacturing tolerances for the value of article produced. In the embodiment of FIG. 13A the parabolic curves that form the parabolic-shaped edges 454 and 458 are congruent and are curvilinear parallel. The parabolic bend curves 462 and 466 define a region A on the pre-form 450. FIG. 13B depicts a perspective view of the pre-form 450 after the first edge 454 has been bent upward (as indicated by the perspective of FIG. 13B) along the first bend curve 462 perpendicular to region A, and after the second edge 458 has been bent downward (as indicated by the perspective of FIG. 13B) along the second bend curve 466. These bending processes form a solar collector structure 474 by transforming region A into a compound parabolical surface 478. In some embodiments the surface 478 may be a parabolical surface. In some embodiments the surface 478 may be a conical surfaced. The terms "conical shape," "conical surface," and "conical portion" as used herein refers to a shape that has a best-fit non-linear regression coefficient between its surface and the surface of a portion of a cone that is at least 0.95. These various surfaces (a compound parabolical surface, a parabolical surface, and a conical surface) are collectively referred to herein as a "trough." Also shown in FIG. 13B is a first support structure 479 and a second support structure 480. In the embodiment of FIG. 13B an edge 481 is formed that lies in more than one geometric plane.

As used herein, the term "compound parabolical curve" refers to a three dimensional curve that is defined by an intersection of orthogonal projections of two parabolical curves on different planes. In some embodiments a three dimensional curve that is defined by an intersection of orthogonal projections of two parabolical curves on orthogonal planes. As used herein, the term "compound parabolical surface" refers to a three dimensional surface that has a surface defined by a parabolical curve when viewed from a first orthogonal perspective (such as a side view) and has an edge defined by a parabolical curve when viewed from a second orthogonal perspective (such as a top view). Compound parabolical curves are "substantially congruent" if, by any spatial translation or rotation of one or both compound parabolical curves, they may be superimposed so as to be substantially coincident throughout. Compound parabolical curves are "substantially parallel" if the curves are substantially congruent and the distance between corresponding points along the length of each curve is substantially constant. The edges of solar reflectors described herein may comprise compound parabolical curves, and may comprise substantially congruent parabolical curves and may comprise substantially parallel compound parabolical curves. The reflecting surfaces of solar reflectors described herein may comprise a compound parabolical surface.

Figure 13C:
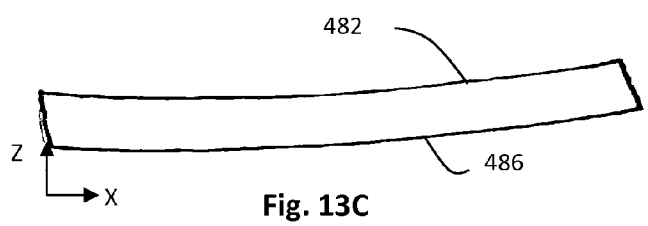
FIG. 13C is top plan view of the 3-dimensional sheet structure of FIG. 13B.
Figure 13D:
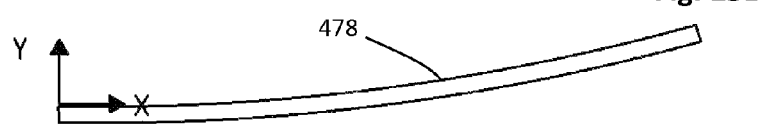
FIG. 13D is a front view of the 3-dimensional sheet structure of FIG. 13B.
Figure 14A:
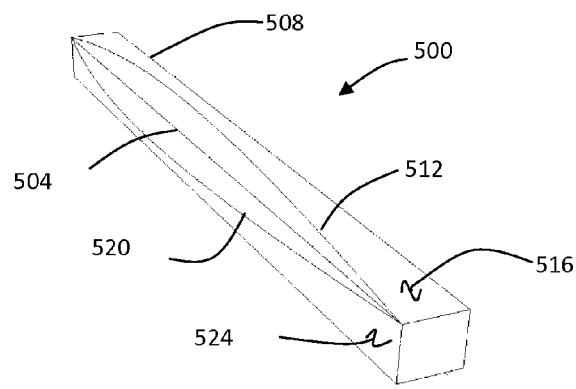
FIGS. 14A-14C are somewhat schematic views of a die pair for forming solar reflectors.
Figure 14B:
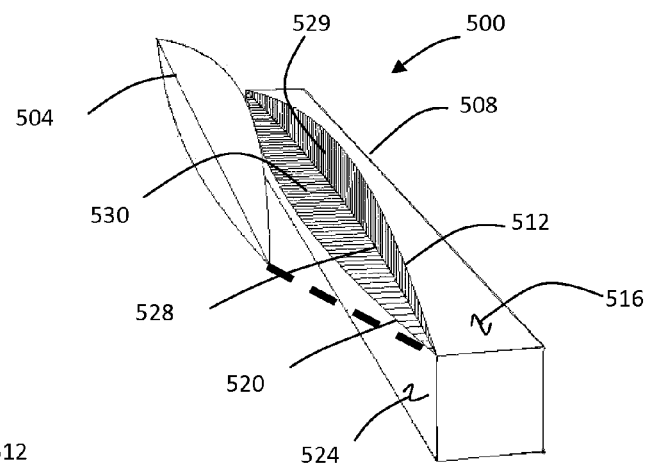
Figure 14C:
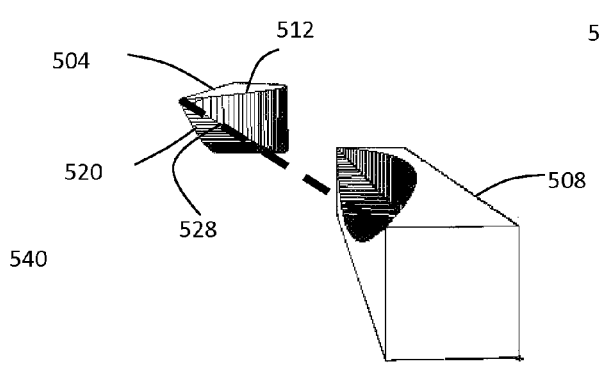

FIG. 13C is a top view (the X-Z plane) of solar collector structure 474 illustrating two parabolical edges 482 and 486. FIG. 13D is a front view (the X-Y plane) of the solar collector structure 474 showing the parabolical curved surface 478. The parabolical curved surface 478 of the solar collector structure 474 may be mated with the back surface of a flat glass mirror. In such a configuration the solar collector structure 474 is an example of a guide having a parabolical mounting surface, where the guide has two opposing parabolical edges, and where the parabolical mounting surface of each guide is mated with the back surface of a flat glass mirror, Equation 1 and Equation 2 represent an example of a compound parabolical curve. FIGS. 14A-14C illustrate how a die set 500 may be fabricated to form a compound parabolical curve in a reflective material. The die set 500 comprises a male portion 504 and a female portion 508 which are joined together in FIG. 14A. FIG. 14A illustrates that the die set 500 is shaped with a first parabolical curve 512 on a first plane 516 and a second parabolical curve 520 on a second plane 524. The first plane 516 is substantially orthogonal to the second plane 524. In some other embodiments the first plane 516 is not substantially orthogonal to the second plane 524. FIG. 14B illustrates a first perspective view of the male portion 504 separated from the female portion 508. The first parabolical curve 512 has been projected orthogonally from the first plane 516 and the second parabolical curve 520 has been projected orthogonally from the second plane 524 and the intersection of these two orthogonal projections forms a compound parabolical curve 528. If at least one of the two parabolical curves is substantially parabolic then the compound curve is referred to as a substantially compound parabolic curve. Parabolical surfaces 529 and 530 are depicted in FIG. 14B. In some embodiments a conical surface or a parabolic surface or another shape may be substituted for parabolical surface 529 and/or parabolical surface 530.

Another method of manufacture of bend curve reflectors is to progressively bend the supporting conical portion along its length while increasing the bend angle in one or more steps to the desired value. This manufacturing setup is less expensive than a die and has been tested and shown to be reliable. It should especially be of use for complex designs.

FIG. 14C illustrates a second perspective view of male portion 504 separated from the female portion 508. Note that the male portion 504 has substantially the same compound parabolic curve 528 as the female portion 504 because it is formed from substantially the same orthogonal projections of the first parabolical curve 512 and the second parabolical curve 520. A reflective surface having a compound parabolical curve may be formed by placing a sheet of malleable reflective material between the male portion 504 and the female portion of the die set 500 and pressing the male portion 504 and the female portion 508 of the die set 500 together. For prototype fabrication and small quantity production the die set 500 may be fabricated from wood, using a band saw to cut the orthogonal projections of the first parabolical curve 512 and the second parabolical curve 520. Such a process forms the male portion 504 as a single piece and the female portion 508 as three pieces which may be joined together to form the female portion 508. In using a die set such as die set 500 of FIGS. 14A-14C to fabricate a solar reflector, perforating or scoring the sheet material along the surface where the bend curve will be formed helps to mitigate wrinkling and other surface deformities in the finished reflector surface.

Figure 14D:
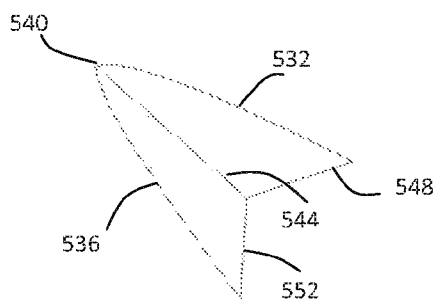
FIGS. 14D-14I depict the graphical sequence of steps for forming two parabolical curves for use in forming solar reflectors.
Figure 14E:
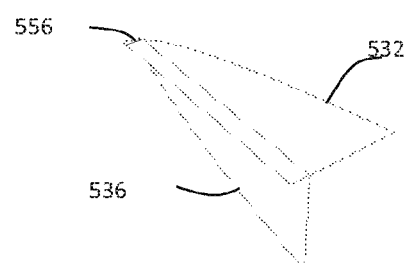
Figure 14F:
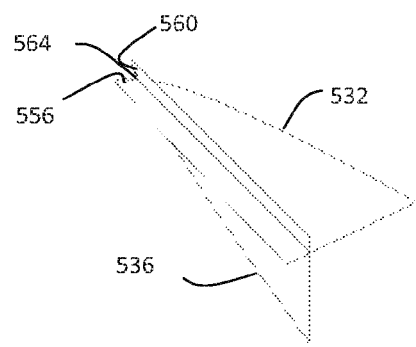
Figure 14G:
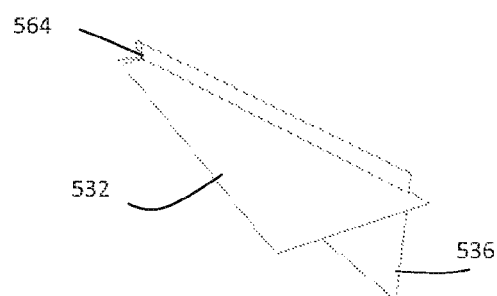
Figure 14H:
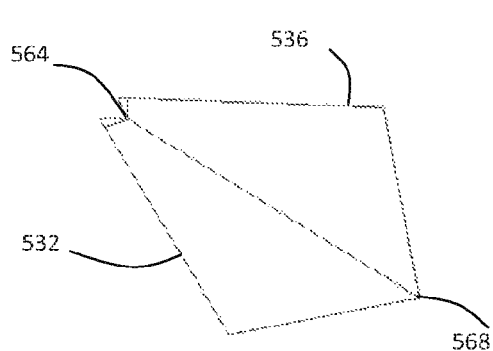
Figure 14I:
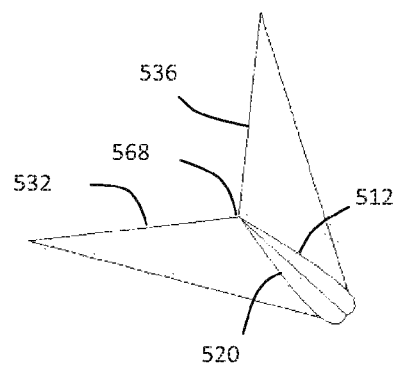

FIGS. 14D-14I illustrate how the first parabolical curve 512 and the second parabolical curve 520 may be defined. FIG. 14D illustrates two orthogonal parabolical curves, a first parabolical curve 532 and a second parabolical curve 536. In the embodiment of FIGS. 14D-14I, although the first parabolical curve 532 and the second parabolical curve 536 are orthogonal, the first parabolical curve 532 and the second parabolical curve 504 are congruent in shape and have a common geometric origin 540. For ease of visualization of the geometric planes involved, an axis 544 and chord lines 548 and 552 have been added to the first parabolical curve 532 and the second parabolical curve 536. The specific shape of the first parabolical curve 532 and the second parabolical shape 536 and other parameters illustrated in FIGS. 14D-14I may be calculated mathematically or may be developed experimentally to fit the design requirements of a particular solar reflector. In FIG. 14E the first parabolical curve 532 has been shifted to the left by a distance 556 and in FIG. 14F the second parabolical curve 536 has been shifted up by a distance 560. In the embodiment of FIGS. 14F-14I, the distance 560 is equal to the distance 556 such that the first parabolical curve 532 and the second parabolical curve 536 intersect at a first point 564. In FIG. 14G the first parabolical curve 532 has been rotated in its plane around the point 564 and in FIG. 14H the second parabolical curve 536 has been rotated in its plane around the point 564 until the first parabolic curve 532 and the second parabolic curve 536 intersect at a second point 568. FIG. 14I is a view of the first parabolic curve 532 and the second parabolic curve 536 from "below" the view of FIG. 14H, looking upward. That perspective of FIG. 14I illustrates the first parabolical curve 512 and the second parabolical curve 520 that are depicted in FIGS. 14A-14C.

Figure 15A:
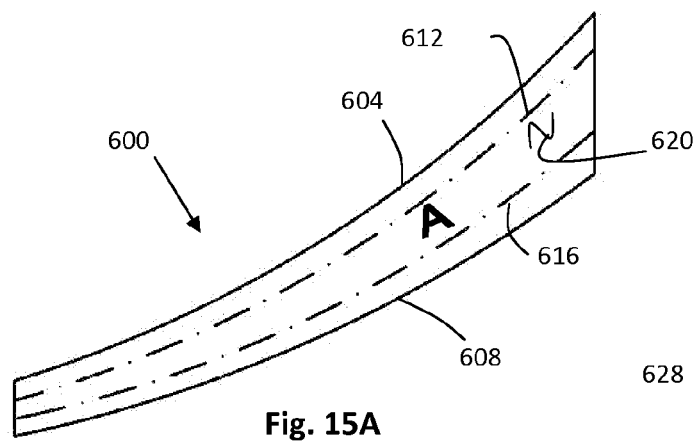
FIG. 15A is a top plan view of a sheet material with two bend curves depicted thereon.

FIG. 15A depicts a plan view of a pre-form 600 for a solar collector structure. The pre-form 600 is formed from flat sheet material, such as sheet metal. The pre-form 600 has a first parabolical edge 604 and a second parabolical edge 608. The pre-form 600 also has two bend parabolical bend curves 612 and 616 inscribed on the surface 620 of the pre-form 450. In the embodiment of FIG. 15A the parabolical bend curves 612 and 616 are congruent but are not parallel. The parabolical bend curves 612 and 616 define a region A on the pre-form 600. Methods that involve bending a sheet along a curve to fabricate a solar radiation collector may employ any formable sheet material. For example, aluminum reflector sheet with corrosion resistant coating made by ALANOD™ may be used as the sheet. Reflector sheets made from reflective film that is adhered to a support sheet such as reflector sheets made by REFLECTECH™ may be use as the sheet. Bend curve methods described herein may be used to form an underlying structure for reflectors, such as glass reflectors, which may be held or formed to shape using tabs or adhesive on the underlying structure. An alternate system for manufacturing a solar radiation collector is to bend a very thin stainless steel sheet along a curve to fabricate the solar radiation collector. Highly reflective and durable stainless steel may be procured at thicknesses as thin as 0.003" or 0.004". Such material may be fabricated into a solar radiation collector by using the bend curve design. At current prices, such stainless reflectors may now be about 8 to 10 times cheaper than any of the established glass, aluminum, or film based reflector options that are available on the market In contrast, for the majority of competitive reflector designs, stainless steel is not currently a viable option due to its cost due to the thickness of it traditionally required. While some stainless steel sheets may have less reflectance than aluminum, such sheets are typically sufficiently reflective and with their inherent corrosion resistance they will likely last many years longer than unprotected or anodized aluminum.

Curve bending may, for example, be accomplished by making a curved cut fully through the sheet and hinging the two cut pieces, such as with a flexible strip affixed to both cut pieces or with a jointed mechanical hinge. Alternately, the curve bending may, for example, be accomplished by impressing (i.e., making a depression along) a curved line or by scoring the sheet along a curved line or by removing a portion of the thickness of the material along a curved line or by perforating the sheet along a curved line, and then bending the sheet along the curved line.

Figure 15B:
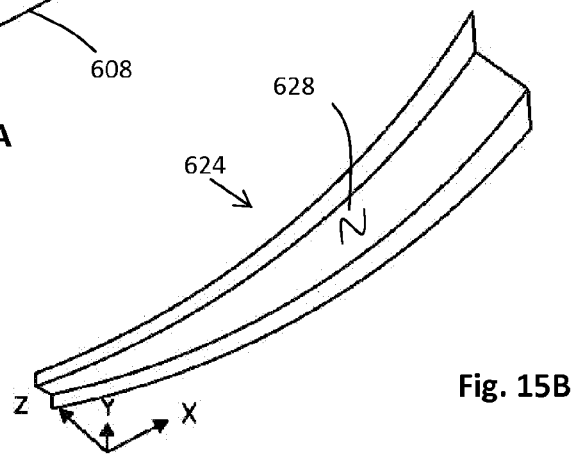
FIG. 15B is perspective drawing of the sheet material of FIG. 14A after it is bent at 90° along the bend curves to form a 3-dimensional sheet structure.
Figure 15C:
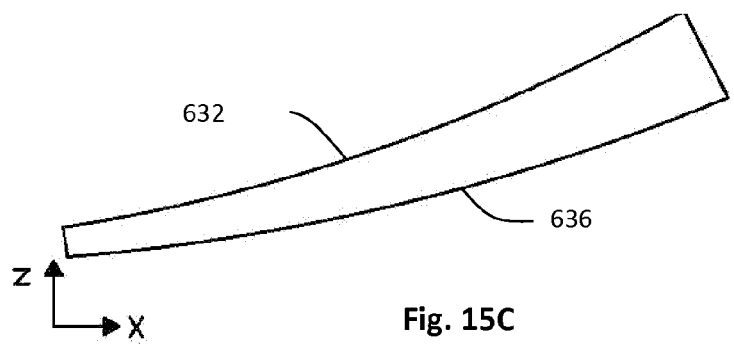
FIG. 15C is top plan view of the 3-dimensional sheet structure of FIG. 14B.
Figure 15D:
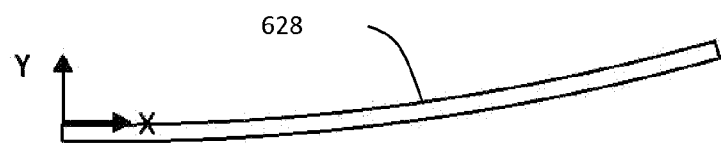
FIG. 15D is a front view of the 3-dimensional sheet structure of FIG. 14B.

FIG. 15B depicts a perspective view of a radial style preform 600 after the first edge 604 has been bent upward (as indicated by the perspective of FIG. 15B) along the first bend curve 612 perpendicular to region A, and after the second edge 608 has been bent downward (as indicated by the perspective of FIG. 13B) along the second bend curve 616. A die set such as die set 500 of FIGS. 14A-14C, or a progressive bending operation may be used to facilitate the bending process. These bending processes form a solar collector structure 624 by transforming region A into a parabolical curve surface 628 that is a compound parabolical surface. FIG. 15C is a top view (the X-Z plane) of solar collector structure 624 illustrating two parabolical curve edges 632 and 636. FIG. 15D is a front view (the X-Y plane) of the solar collector structure 624 showing the parabolical curve surface 628. The first bend curve 612 and the second bend curve 616 may both be defined using Equations 1 and 2 where the X and Y axis for the two bend curves 612 and 616 are angularly rotated and displaced in the X and Y directions from each other.

Figure 16:
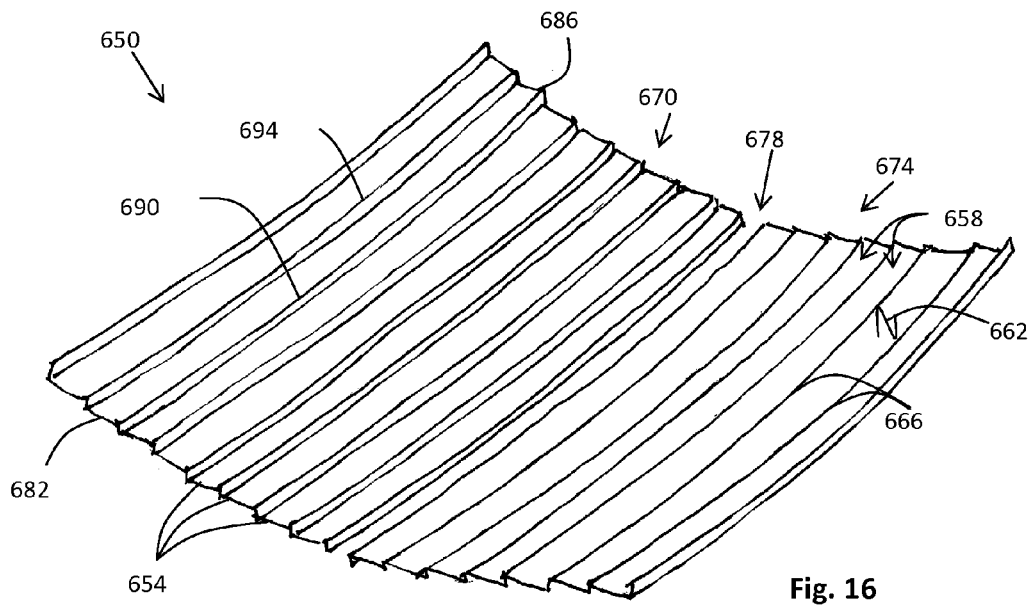
FIG. 16 is a perspective drawing of a solar concentrator formed from 3-dimensional sheet structures similar to those depicted in FIGS. 15B-15D.

FIG. 16 depicts a solar collector 650 that is fabricated using a plurality of solar collector structures 654 similar to solar collector structures 474 depicted in FIGS. 13B, 13C, and 13D. In the embodiment of FIG. 16 the solar collector structures 654 are formed from individual pieces of sheet material having a highly reflective surface. In other embodiments the solar collector structures 654 may be a support structure upon which a flat glass mirror is disposed. In some embodiments the plurality of solar collector structures 654 may be formed (stamped out or bent along bend curves) from a single piece of sheet material or two or more pieces of sheet material. The resultant solar collector 650 has a plurality of solar reflectors 658 with each solar reflector 658 having a parabolical reflecting surface 662 and each solar reflector 658 having a two opposing parabolical edges 666, with at least one of the parabolical edges 666 of each solar reflector 658 being disposed adjacent one of the parabolical edges 666 of another solar reflector 658 (except for the outermost solar reflectors 658. In this embodiment the two opposing parabolical edges 666 have substantially the same parabolical contour.

The solar collector 650 has a first panel 670 and a second panel 674 separated by a space 678. The space 678 provides a region for construction of additional support framework for the panels 670 and 674, and for other structures that may be useful with the solar collector 650. In some embodiments the first panel 670 and the second panel 674 may adjoin each other without a space 678 between. Each of the solar collector structures 654 have opposing ends, i.e., a lower end 682 and an upper end 686. Each of the solar collector structures 654 have sides that form a lower edge 690 and an opposing upper edge 694.

Figure 17:
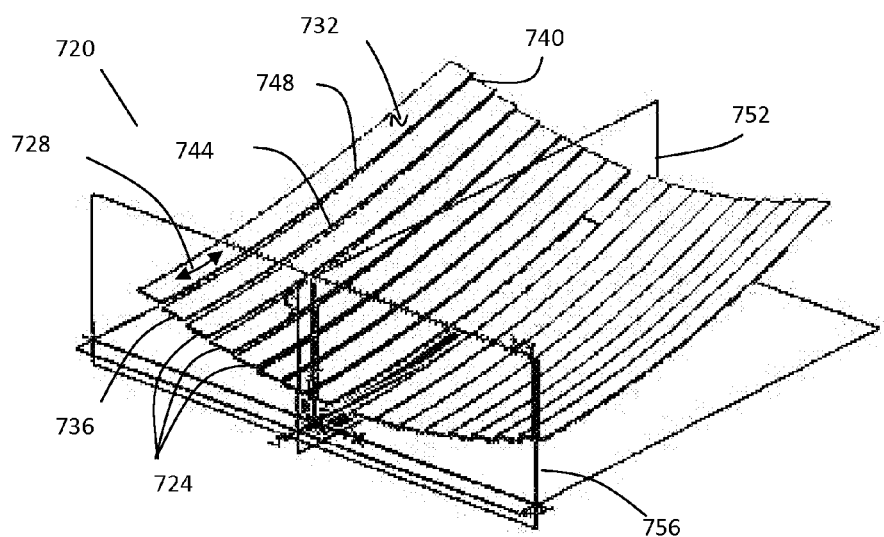
FIG. 17 is a perspective drawing of a solar concentrator formed from compound-curved mirrors.

FIG. 17 depicts a solar collector 720 that fabricated using a plurality of mirror segments 724. The mirror segments 724 may be individual mirrors or may be sections of a single mirror. In some embodiments the mirror segments 724 may be formed from glass and in some embodiments the mirror segments may be formed from reflective metal. Each of the mirror segments 724 have a longitudinal direction 728 and each of the mirror segments 724 have a curved surface 732 that has a parabolical shape in the plane of the longitudinal direction 728. Each of the mirror segments 724 have opposing ends, i.e., a lower end 736 and an upper end 740. Each of the mirror segments 724 have sides that form a lower edge 744 and an opposing upper edge 748. The solar collector 720 has a longitudinal focal plane 752 and a transverse focal plane 756. The lower ends 736 of the mirror segments 724 are disposed adjacent the transverse focal plane 756. The longitudinal direction 728 of the mirror segments 724 is disposed in a direction that is generally parallel to the longitudinal focal plane 752. Also the mirror segments 724 are disposed offset from each other in a direction that is generally perpendicular to their sides (i.e., their lower edge 744 and upper edge 748) such that for an interior glass mirror the lower edge 744 of each interior mirror segment 724 is disposed adjacent the upper edge 748 of an adjacent mirror segment 724. An interior mirror segment is a mirror segment 724 that has an adjacent mirror segment 724 in the direction away from the longitudinal focal plane.

Figure 18:
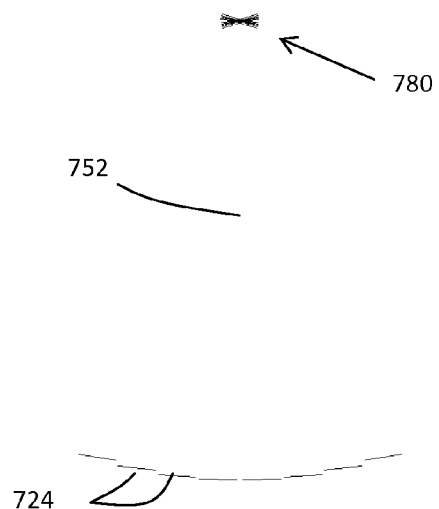
FIG. 18 is a somewhat schematic front view of the solar concentrator of FIG. 18 illustration a pattern of solar energy convergence.

FIG. 18 depicts a portion of the glass mirror segments 724 of solar collector 720 as viewed in the transverse focal plane 756. As seen in FIG. 18, the focal zones 780 of adjacent flat glass mirrors are angularly offset from each other in the transverse focal plane. In the embodiment of FIGS. 17 and 18 the focal zones 780 form a "bow-tie" pattern.

Figure 19:
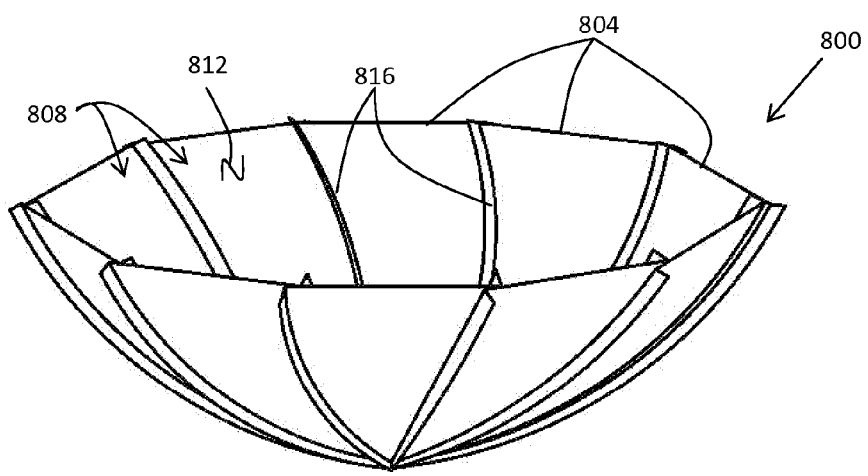
FIG. 19 is a perspective drawing of a solar concentrator formed from 3-dimensional sheet structures similar to those depicted in FIGS. 16B-16D.

FIG. 19 depicts a solar collector 800 that is fabricated using a plurality of solar collector structures 804 similar to solar collector structures 624 depicted in FIGS. 15B, 15C, and 15D. In the embodiment of FIG. 19 the solar collector structures 804 are formed from sheet material having a highly reflective surface. In other embodiments the solar collector structures 804 may be a support structure upon which a flat glass mirror is disposed. The resultant collector 800 has a plurality of solar reflectors 808 with each solar reflector 808 having a parabolical reflecting surface 812 and each solar reflector 808 having a two opposing parabolical edges 816, with at least one of the parabolical edges 816 of each solar reflector 808 being disposed adjacent one of the parabolical edges 816 of another solar reflector 808. In this embodiment the two opposing parabolical edges 816 have substantially the same parabolical contour. Further in this embodiment, the plurality of solar reflectors 808 are disposed in a 360° parabolical surface of revolution. In other embodiments the parabolical surface of revolution may be a surface of revolution that is less than 360°. This radial style design may be used to form a stack of nesting reflectors which pivot around a common center point and deploy similarly to a traditional hand held folding fan except sliding under each other from a single stack instead of deploying in an accordion like fashion. The radial style reflectors can employ engaging tabs or an outer tensioning member which will space them and keep them together along the rim when folded out.

Figure 20A:
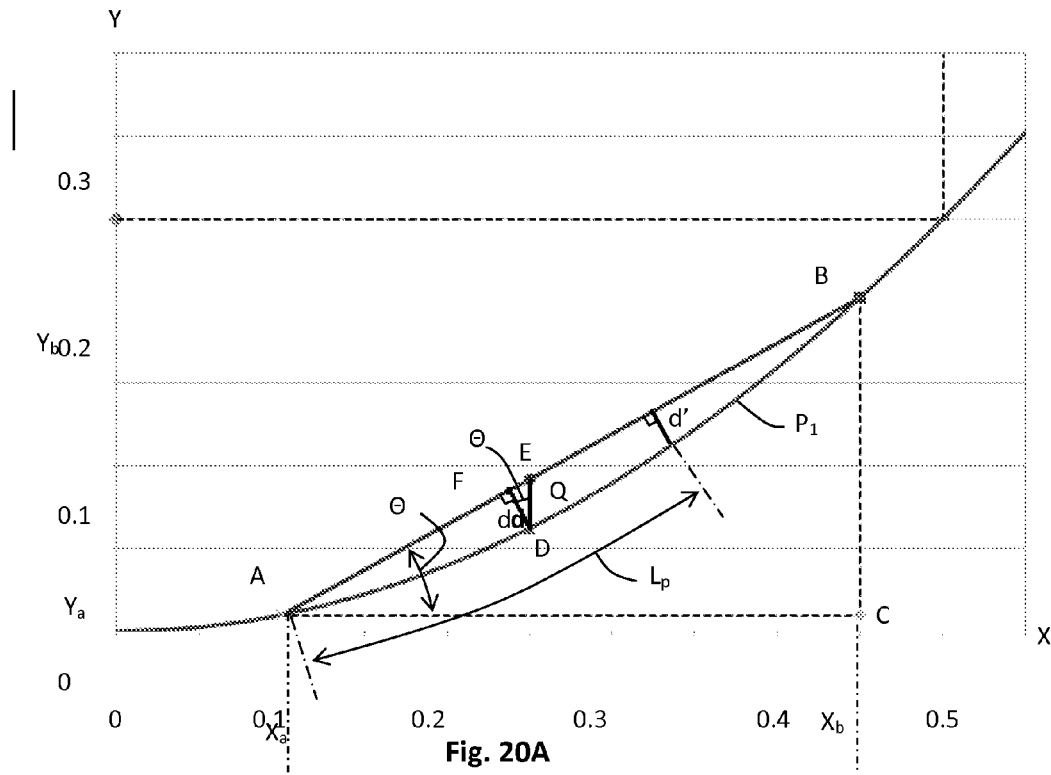
FIG. 20A is a graph of a 2-Dimensional Bend Curve.
Figure 20B:
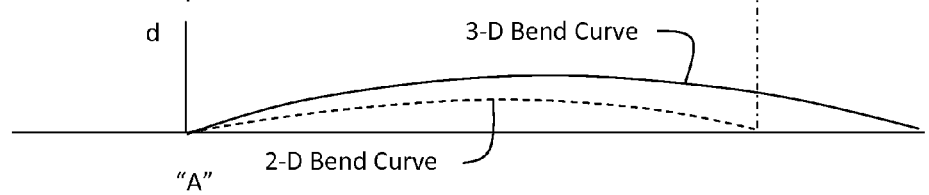
FIG. 20B is a graph of a 2-Dimensional Bend Curve and a 3-Dimensional Bend Curve.

FIGS. 20A and 20B illustrate the derivation of parametric equations for structural folds in some embodiments generally where the bend angles are close to 90 degrees. Typically a structural fold is defined in 3-D space, in terms of X, Y and Z axes. FIG. 20A depicts a 3-D structural fold as viewed from the X-Y plane. In typical embodiments the structural fold is a portion of a compound parabolical curve that intersect at two points, such as points A and B in FIG. 20A. In the 3-D space that corresponds to FIG. 20A, point A is into the page and point B is further into the page. The 3-dimensional structural fold (also referred to herein as the 3-dimensional bend curve or the 3-D bend curve or the 3DBC) is behind $P_1$, in the view of FIG. 20A. $P_1$ defines one of two 2-dimensional bend curves (also referred to herein as 2-D bend curves or 2DBCs) that establish the 3-D bend curve. The 3-dimensional bend curve is an example of a compound parabolical curve.

$P_1$ is mathematically defined by Equation 3.

$$y_{P1} = x^2 \quad \text{(Eq'n 3)}$$

It is useful to define the distance "d" as a function of x and to define "d" as a function of $L_p$. The 2-D bend curve may be derived by starting with the general equation of a straight line, having a slope "m," as shown in Equation 4.

$$Y - Y_1 = m(X - X_1) \text{ or } Y = m(X - X_1) + Y_1 \quad \text{(Eq'n 4)}$$

m is given by Equation 5:

$$m = \left(\frac{x_b^2 - x_a^2}{x_b - x_a}\right) \quad \text{(Eq'n 5)}$$

then, referring to FIG. 20A, Y values for Line 1($L_1$—the straight line between points A and B) are given by Equation 6:

$$Y_{L1} = \left(\frac{X_b^2 - X_a^2}{X_b - X_a}\right)(X - X_a) + X_a^2 \quad \text{(Eq'n 6)}$$

The distance "d" may be derived by first solving for angle Θ, and then solving for side Q, and then solving for d.

Similar triangles ABC and DEF allow for the calculation of distance (d) spanning from point D to point F by either trigonometry or the Pythagorean principle. Angles BAC and EDF are the same, indicated by in notation. Note line FD is at a right angle to line AB, and thus has the negative inverse slope of line AB.

Distance d is solved in Equations 7A and 7B, using trigonometry:

$$\tan\theta = \frac{Y_b - Y_a}{X_b - X_a} = \frac{X_b^2 - X_a^2}{X_b - X_a} \quad \text{(Eq'n 7A)}$$

$$\theta = \tan^{-1}\left(\frac{X_b^2 - X_a^2}{X_b - X_a}\right) \quad \text{(Eq'n 7B)}$$

Distance Q is given by Equation 8:

$$Q = Y_E - Y_D = Y_{L1} - Y_{P1} \quad \text{(Eq'n 8)}$$

Relationships between Θ and Q are given by Equations 9A and 9B:

$$\cos(\theta) = \frac{d}{Q} \quad \text{(Eq'n 9A)}$$

and $$d = Q\cos(\theta) \quad \text{(Eq'n 9B)}$$

Then by substitutions, Equations 10A and 10B define d in terms of X and Y:

$$d = (Y_{L1} - Y_{P1})\cos\left(\tan^{-1}\left(\frac{X_b^2 - X_a^2}{X_b - X_a}\right)\right) \quad \text{(Eq'n 10A)}$$

giving:

$$d = \left(\left(\left(\frac{X_b^2 - X_a^2}{X_b - X_a}\right)(X - X_a) + X_a^2\right) - X^2\right)\cos\left(\tan^{-1}\left(\frac{X_b^2 - X_a^2}{X_b - X_a}\right)\right) \quad \text{(Eq'n 10B)}$$

Figure 21:
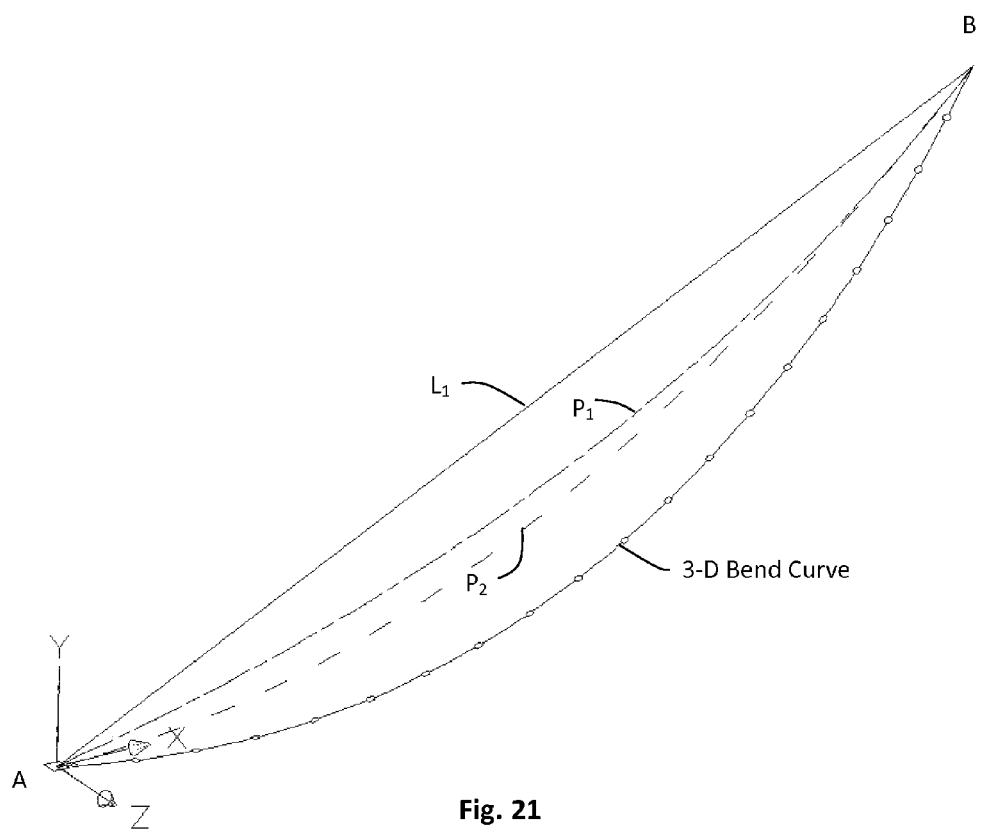
FIG. 21 is a graph of a two 2-Dimensional Bend Curves and a 3-Dimensional Bend Curve.
Figure 22A:
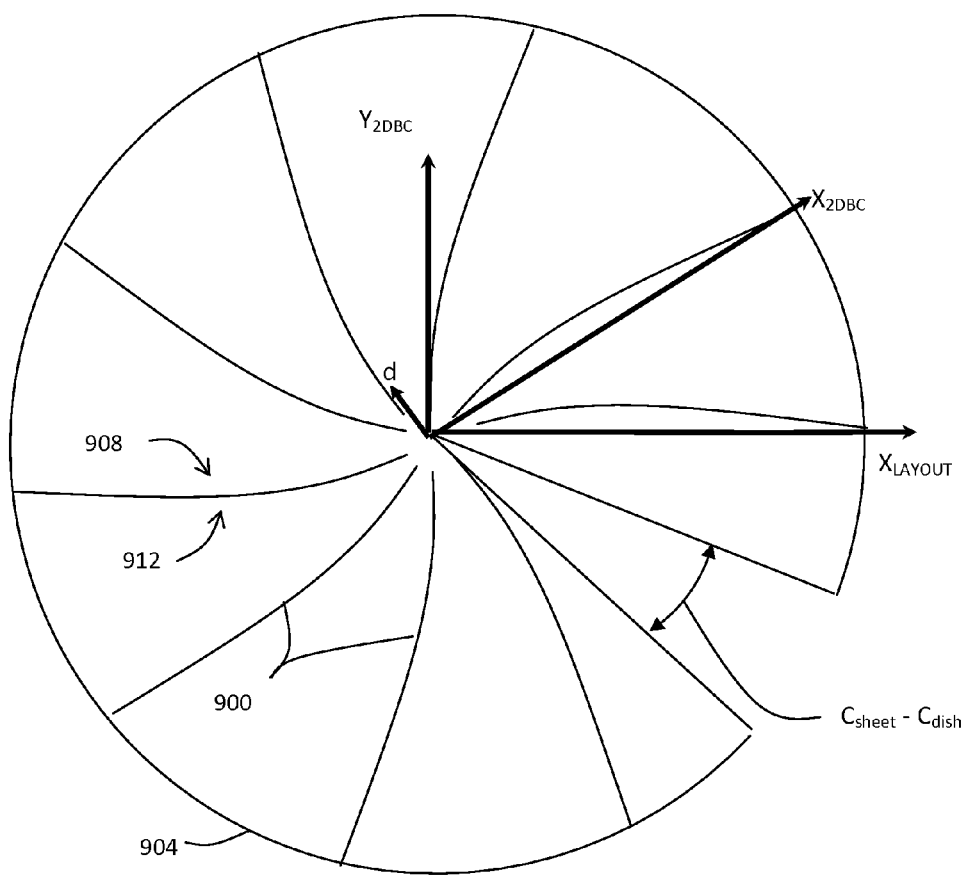
FIGS. 22A-22G depict layout features for a spiral-cut solar concentrator.
Figure 22B:
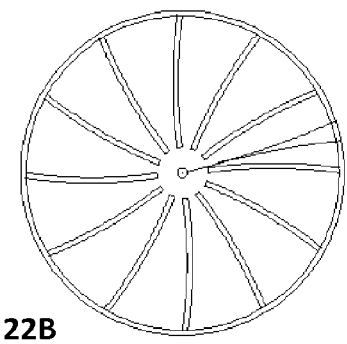
Figure 22C:
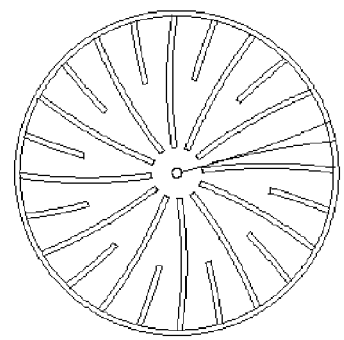
Figure 22D:
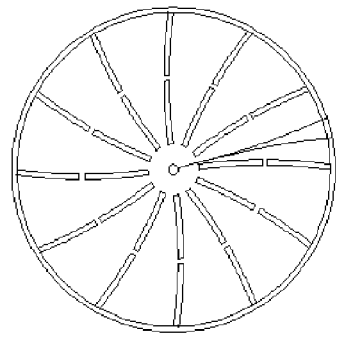
Figure 22E:
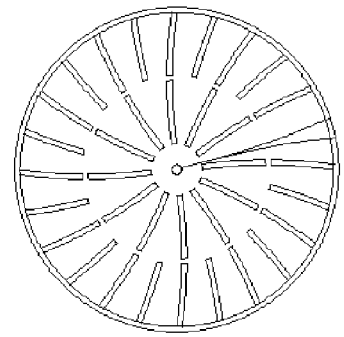
Figures 22F, 22G:
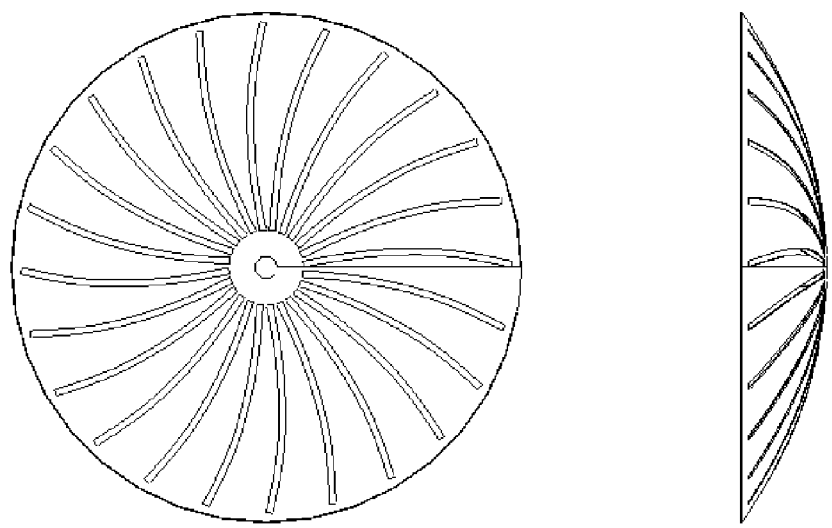

As previously noted with respect to FIG. 20A, in 3-D space, point A is into the page and point B is further into the page, and the 3-dimensional bend curve is behind the first 2-D bend curve $P_1$. The 3-D bend curve is defined by both $P_1$ and by a second 2-D bend curve $P_2$. Distance d defined by Equation 10B is also the Z value of $P_2$ and the 3 dimensional bend curve. This is because $P_1$ is congruent in shape with $P_1$, but rotated about line AB by 90 degrees. The points on the 3 dimensional bend curve are those in which the perpendicular projections from parabolas 1 and 2 intersect. This is illustrated in FIG. 21, which shows the 3D bend curve figure where the 3D origin is on point A of the 2D bend curve shown in FIG. 20A. The distance "D" in FIG. 20A is the distance from line AB to the 3D bend curve. "d" is shorter than "D."

If the 3 dimensional bend curve is created from a flexible material with a structural fold along the 3 dimensional bend curve, and generally for bend angles close to 90 degrees, then the 2 dimensional bend curve may be solved in the following way. The 2D bend curve will have a separate $X_{2DBC}$ value equal to the length along parabola 1 ($P_1$) at a given X, which equals the length of the material as it is conforming to the curvature along the parabola 1 ($P_1$), and a Y value which is equal to the distance d at that given X value which provides the relative bending position to form the 3DBC by bending the material straight up or down along the 2DBC edge.

The length of a two dimensional parabolic curve ($L_p$) with end points $X_a$ and $X_b$ where $0 \leq X_a < X_b$ may be derived from the integral for the length of a curve and the $Y_{P1}$, as presented in equation 11:

$$L_p = 0.5X_b(1+4X_b^2)^{0.5} + 0.25 \ln(2X_b + (1+4X_b^2)^{0.5}) - 0.5X_a(1+4X_a^2)^{0.5} - 0.25 \ln(2X_a + (1+4X_a^2)^{0.05}) \quad \text{(Eq'n 11)}$$

FIG. 22 illustrates a pattern for a solar concentrator, where slits 900 are formed in a reflective sheet material. In the embodiment of FIG. 22 the slits 900 are formed as a spiral pattern of curves cut into sheet material formed as a circle 904. Each slit has a shape according to d given by Equation 10B, with X given by a 2-DBC curve. A gap defined by Csheet-Cdish is provided to permit the sheet material to be formed into a parabolic dish shape. Csheet and Cdish are defined by Equations 12A and 12B:

$$C_{dish} = 2\pi X \quad \text{(Eq'n 12A)}$$

$$C_{Sheet} 2\pi L_p \quad \text{(Eq'n 12B)}$$

Degrees of Arc Length Gap (α) is Given by Equation 13.

In some embodiments the slits 900 may, for example, be formed as parallel slits into sheet material formed as a rectangle or square. In some embodiments the spiral shape formed by the slits 900 may be formed by step pattern (such as depicted in FIG. 19). In some embodiments the slits 900 may be disposed as parallel objects (instead of being disposed in a spiral pattern as in FIG. 22. As seen in FIG. 22, each slit 900 has a concave side 908 and a convex side 912. In the embodiment of FIG. 22, for each slit 900 its concave side 908 faces the convex side 912 of a first adjacent slit 900, while its convex side 912 faces concave side of a second adjacent slit 900. In some embodiments the slits 900 may be formed in a pattern of alternating orientations where for each slit 900, its convex side faces the convex side of a first adjacent slit 900, while its concave side faces the concave side of a second adjacent slit 900.

The following is a geometric description of a bend curve generated surface which may be formed with a choice of bend angle and which also yields a reflector with curvature that may be varied dynamically if desired by varying the bend angle through flexing of the joint. A flat surface can be made to approximate a curved or a parabolical surface by folding a surface along a curve which then divides the surface into two parts and creates at least one second surface being a conical portion having a curved edge which gives the first surface a desired target approximate parabolic curvature relative to a specified plane. Note the bend curve when in the flat surface state may be an arc or other curve. Also note that using two separated bend curves to form the target curved surface of interest will control and create the surface more accurately than if a single bend curve is used. The bend curve surface generation theory will be illustrated using two conical portions as a convenient design methodology but note that the first surface is not limited to being a conical portion.

Figure 23:
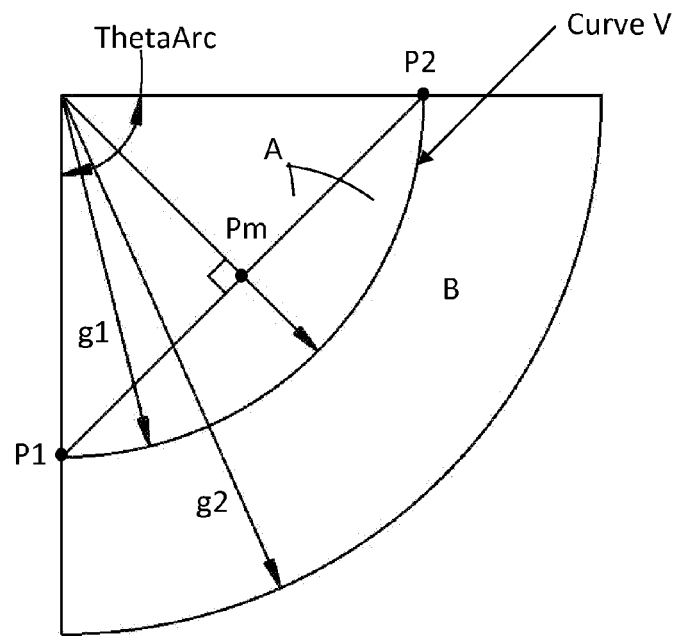
FIGS. 23 and 24 depict various embodiments of bend curve features.

In one example a surface curvature will be generated along a path containing points P1, Pm, and P2, and this path will be a line before folding, and can approximate a parabolic curve after folding. To show this concept in the simplest way, the curve before folding will be shown as an arc of radius g1 in FIGS. 23 and 24. In FIG. 23, note areas A and B of the pie shaped surface in an initial flat state, apex point Papex, arc angle ThetaArc, end points P1 and P2 of curve V, the midpoint Pm of the line between end points P1 and P2, and generatrix distances g1 and g2.

Figure 24:
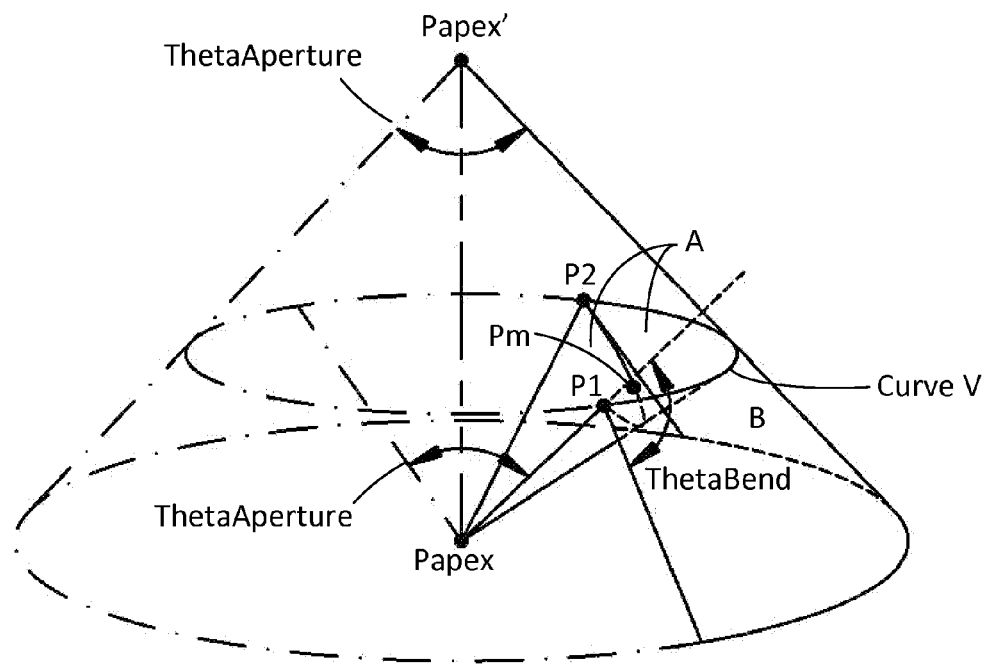

FIG. 24 shows the surface of FIG. 23 folded along curve V at a given folding or bending angle ThetaBend and points P1, Pm, and P2 now lie on a curve in a plane. In this figure, area A is a portion of a right circular cone having the apex point P and a base along curve V which lies in a circle in a plane. Likewise due to folding, area B is formed into a conical portion and in this instance a truncated cone or frustum, having an apex point Papex' not lying on a surface. It was found that the aperture angle ThetaAperture is the same for both cone A and cone segment B, and is equal to 180 degrees—ThetaBend. Note that the base of cone segment B does not have to lie in a circle if its longer edge is not designed as an arc in the flat state shown in FIG. 23 since the designed surface boundary may lie anywhere on the theoretically infinite truncated cone. Again note that the surface A, when constrained on only one side by a bend curve will tend to flatten out as it extends further from the bend curve unless its opposite side is also constrained by a bend curve. For parabolic troughs with short enough width, this effect may be negligible and one bend curve on one side of the material could be sufficient to generate the required curvature. One skilled the engineering arts can use this information to further derive by numerous geometric methods the arc yielding a desired surface curvature given by points P1, Pm, and P2.

Figure 25:
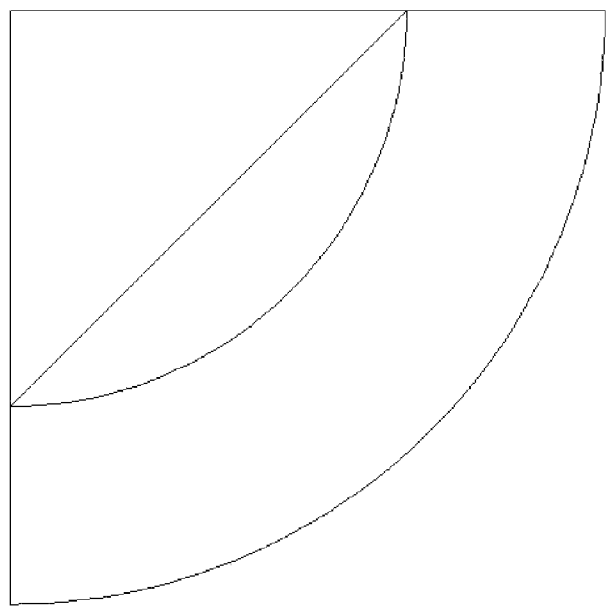
FIG. 25 illustrates a bend curve for forming a trough.

FIG. 25 shows how bend curves can be used to create a concave trough. It may have two flat folded portions A and B, to help control the surface if necessary. If either of the flat portions is folded upwards on a solar collector, they may be used to aid in collecting rainwater falling on the collector and sending it down the length of the flat bent portions.

Figure 26:
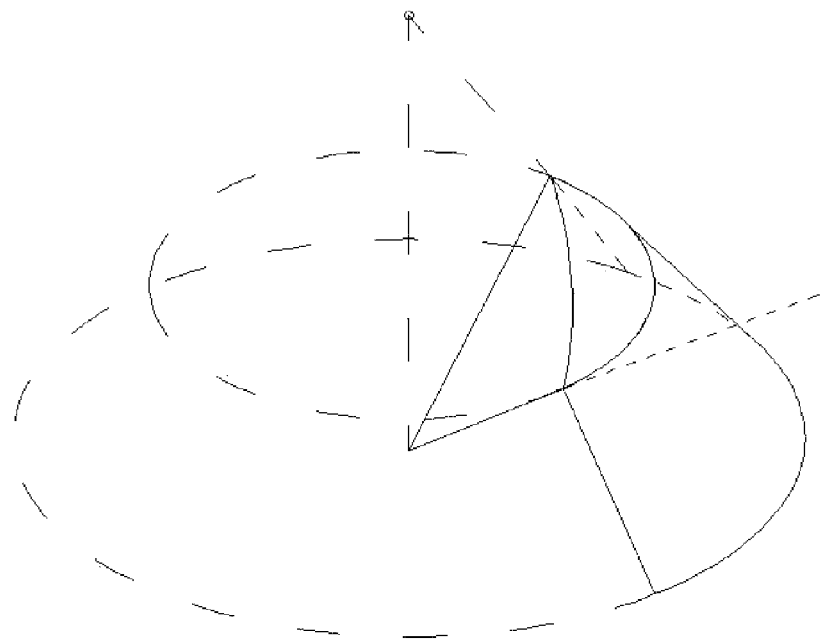
FIG. 26 illustrates bend curves for forming a concave trough.

FIG. 26 shows how bend curves can be used to create triangular-like reflectors with a curved surface.

FIGS. 27-31 show how multiple supports may be designed into the same sheet of material to create a one piece Fresnel parabolic reflector.

In summary, embodiments disclosed herein provide a variety of embodiments for solar collectors. The foregoing descriptions of embodiments have been presented for purposes of illustration and exposition. They are not intended to be exhaustive or to limit the embodiments to the precise forms disclosed. Obvious modifications or variations are possible in light of the above teachings. The embodiments are chosen and described in an effort to provide the best illustrations of principles and practical applications, and to thereby enable one of ordinary skill in the art to utilize the various embodiments as described and with various modifications as are suited to the particular use contemplated. All such modifications and variations are within the scope of the appended claims when interpreted in accordance with the breadth to which they are fairly, legally, and equitably entitled.

What is claimed is:

1. A solar collector having a longitudinal focal plane and a transverse focal plane comprising:
    a plurality of mirror segments each mirror segment having a lower end and an opposing upper end and a lower side and an opposing upper side wherein,
        each mirror segment comprises a compound parabolical curved surface having focal zone;
        the lower end of each of the mirror segments is disposed adjacent the transverse focal plane,
        the mirror segments are disposed in a direction that is generally parallel to the longitudinal focal plane and are disposed offset from each other in a direction that is generally perpendicular to their sides such that for an outward mirror segment the lower edge of each outward mirror segment is disposed adjacent the upper edge of an adjacent mirror segment, and the focal zones of adjacent mirror segments are angularly offset from each other in the transverse focal plane.

2. The solar collector of claim 1 wherein the plurality of mirror segments is formed from a single sheet material that is bent along a plurality of bend curves to form a plurality of first and second regions.

3. The solar collector of claim 1 where in the plurality of mirror segments comprises
    a plurality of flat glass mirrors, each flat glass mirror having two opposing ends and two opposing substantially parallel sides that are generally orthogonal to the ends and that define a longitudinal direction, and each flat glass mirror having a substantially flat shape when in a free state, and wherein the solar collector panel further comprises a frame structure configured to deflect and constrain each flat glass mirror with a plurality of hold-down sites disposed along the longitudinal direction of each flat glass mirror, wherein each flat glass mirror forms a curved mirror surface having a focal zone that is parallel to that flat glass mirror's curved surface, and wherein solar light is reflected from the plurality of constrained flat glass mirrors to a solar light concentration zone.

* * * * *